US012763881B2

(12) United States Patent
Ly et al.

(10) Patent No.: US 12,763,881 B2
(45) Date of Patent: Oct. 13, 2026

(54) INDICATION OF A REPETITION FACTOR FOR A THIRD MESSAGE OF A RANDOM ACCESS PROCEDURE

(71) Applicant: QUALCOMM Incorporated, San Diego, CA (US)

(72) Inventors: Hung Dinh Ly, San Diego, CA (US); Mahmoud Taherzadeh Boroujeni, San Diego, CA (US); Kexin Xiao, Shanghai (CN)

(73) Assignee: QUALCOMM Incorporated, San Diego, CA (US)

( * ) Notice: Subject to any disclaimer, the term of this patent is extended or adjusted under 35 U.S.C. 154(b) by 326 days.

(21) Appl. No.: 18/558,107

(22) PCT Filed: Jul. 28, 2021

(86) PCT No.: PCT/CN2021/108870
§ 371 (c)(1),
(2) Date: Oct. 30, 2023

(87) PCT Pub. No.: WO2023/004617
PCT Pub. Date: Feb. 2, 2023

(65) Prior Publication Data
US 2024/0223312 A1 Jul. 4, 2024

(51) Int. Cl.
*H04L 1/08* (2006.01)
*H04W 74/00* (2009.01)
*H04W 74/0833* (2024.01)

(52) U.S. Cl.
CPC ............. *H04L 1/08* (2013.01); *H04W 74/004* (2013.01); *H04W 74/0833* (2013.01)

(58) Field of Classification Search
CPC ....... H04L 1/08; H04L 1/0003; H04L 1/0009; H04L 1/0016; H04L 1/0025;
(Continued)

(56) References Cited

U.S. PATENT DOCUMENTS

2013/0244717 A1* 9/2013 Adachi .................. H04L 27/36 455/522
2020/0204289 A1* 6/2020 Yoshimoto ............ H04L 1/0025
(Continued)

FOREIGN PATENT DOCUMENTS

WO WO-2021049907 A1 3/2021
WO 2021115157 A1 6/2021
WO 2022178491 A1 8/2022

OTHER PUBLICATIONS

Alcatel-Lucent., et al., "Coverage Enhancement for RACH Messages", 3GPP TSG-RAN WG1 Meeting #76, R1-140153, Prague, Czech Republic, Feb. 10-14, 2014, Feb. 14, 2014 (Feb. 14, 2014), The Whole Document, 5 Pages, pp. 1, 3-4.
(Continued)

*Primary Examiner* — Mohamed A Kamara
(74) *Attorney, Agent, or Firm* — Harrity & Harrity, LLP

(57) ABSTRACT

Various aspects of the present disclosure generally relate to wireless communication. In some aspects, a user equipment (UE) may transmit, to a base station, a first message of a random access procedure. The UE may receive, from the base station, a second message of the random access procedure that indicates information for an uplink grant for a third message of the random access procedure, the information including a modulation and coding scheme (MCS) indication and a transmit power control (TPC) indication. The UE may transmit, to the base station, one or more repetitions of a physical uplink shared channel carrying the third message. A repetition factor for the one or more repetitions may be indicated by at least one of the MCS indication or the TPC indication. Numerous other aspects are described.

30 Claims, 13 Drawing Sheets

(58) Field of Classification Search
CPC ..... H04L 1/1896; H04L 1/1822; H04L 1/189; H04W 74/004; H04W 74/0833; H04W 52/04; H04W 52/18; H04W 52/54; H04W 52/24; H04W 52/50
See application file for complete search history.

(56) References Cited

U.S. PATENT DOCUMENTS

2021/0051596 A1* 2/2021 Lee ........................ H04W 52/48
2023/0262751 A1* 8/2023 Yu .......................... H04W 72/23 370/329
2024/0283559 A1* 8/2024 Echigo .................. H04L 1/0003
2025/0048447 A1* 2/2025 Cirik ..................... H04W 72/04

OTHER PUBLICATIONS

International Search Report and Written Opinion—PCT/CN2021/108870—ISA/EPO—Apr. 25, 2022.

VIVO: "Discussion on Coverage Enhancements for Channels Other than PUCCH and PUSCH", 3GPP TSG RAN WG1 #103-e, R1-2007682, 3rd Generation Partnership Project (3GPP), Mobile Competence Centre, 650, Route Des Lucioles, F-06921 Sophia-Antipolis Cedex, France, vol. RAN WG1, No. e-Meeting, Oct. 26-Nov. 13, 2020, Oct. 17, 2020 (Oct. 17, 2020), 5 Pages, XP051939839.

Wilus Inc: "Discussion on Type A PUSCH repetitions for Msg3", 3GPP TSG RAN WG1 #104b-e, R1-2103702, e-Meeting, Apr. 12-20, 2021, 6 Pages, p. 3.

Moderator (ZTE Corporation): "Final Feature Lead Summary on Support of Type A Pusch Repetitions for Msg3", 3GPP TSG RAN WG1 #105-e, R1-2106247, e-Meeting, May 10 - 27, 2021, 3rd Generation Partnership Project, Mobile Competence Centre, 650, Route Des Lucioles, F-06921 Sophia-Antipolis Cedex, France, vol. RAN WG1, No. e-Meeting; May 10, 2021-May 27, 2021, May 27, 2021, 84 Pages, XP052015768, p. 23-p. 31.

Supplementary European Search Report—EP219512324—Search Authority—Munich—Feb. 24, 2025.

* cited by examiner

500

505

| MCS Index | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| MCS | a | b | c | a | b | c | a | b | c | a | b | c | a | b | c | a |
| Repetition Factor | 1 | | | 2 | | | 3 | | | 4 | | | 7 | | | 8, 12, 16 |

510

| TPC Command | 000 | 001 | 010 | 011 | 100 | 101 | 110 | 111 |
|---|---|---|---|---|---|---|---|---|
| TPC Value (in dB) | Full power | Full power | Full power | 0 | 2 | 4 | 6 | 8 |
| Repetition Factor | 8 | 12 | 16 | 1, 2, 3, 4, 7 | | | | |

520

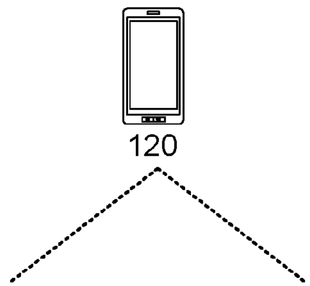

525

<table>
<tr><td>MCS Index</td><td>0</td><td>1</td><td>2</td><td>3</td><td>4</td><td>5</td><td>6</td><td>7</td><td>8</td><td>9</td><td>10</td><td>11</td><td>12</td><td>13</td><td>14</td><td>15</td></tr>
<tr><td>MCS</td><td>a</td><td>b</td><td>c</td><td>a</td><td>b</td><td>c</td><td>a</td><td>b</td><td>a</td><td>b</td><td>a</td><td>b</td><td>a</td><td>b</td><td>a</td><td>b</td></tr>
<tr><td>Repetition Factor</td><td colspan="3">1</td><td colspan="3">2</td><td colspan="2">3</td><td colspan="2">4</td><td colspan="2">7</td><td colspan="2">8</td><td colspan="2">12, 16</td></tr>
</table>

530

<table>
<tr><td>TPC Command</td><td>000</td><td>001</td><td>010</td><td>011</td><td>100</td><td>101</td><td>110</td><td>111</td></tr>
<tr><td>TPC Value (in dB)</td><td>4</td><td>Full power</td><td>Full power</td><td>0</td><td>2</td><td>4</td><td>6</td><td>8</td></tr>
<tr><td>Repetition Factor</td><td colspan="2">12</td><td>16</td><td colspan="5">1, 2, 3, 4, 7, 8</td></tr>
</table>

FIG. 5B

| MCS Index | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| MCS | a | b | a | b | a | b | a | b | a | b | a | b | a | b | a | b |
| Repetition Factor | 1 | | 2 | | 3 | | 4 | | 7 | | 8 | | 12 | | 16 | |

550

| MCS Index | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| MCS | a | b | c | d | a | b | c | d | a | b | c | d | a | b | c | d |
| Repetition Factor | 1 | | | | 2 | | | | 4 | | | | 8 | | | |

560

565

| MCS Index | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| MCS | a | b | c | a | b | c | a | b | a | b | a | b | a | b | a | b |
| Repetition Factor | 1 | | | 2 | | | 3 | | 4 | | 7 | | 8 | | 12 | 16 |

570

| MCS Index | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| MCS | a | b | c | d | a | b | c | d | a | b | a | b | a | b | a | b |
| Repetition Factor | 1 | | | | 2 | | | | 3 | | 4 | | 7 | | 8 | |

INDICATION OF A REPETITION FACTOR FOR A THIRD MESSAGE OF A RANDOM ACCESS PROCEDURE

CROSS-REFERENCE TO RELATED APPLICATION

This Patent Application is a 371 national stage of PCT Application No. PCT/CN2021/108870 filed on Jul. 28, 2021, entitled "INDICATION OF A REPETITION FACTOR FOR A THIRD MESSAGE OF A RANDOM ACCESS PROCEDURE," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for indication of a repetition factor for a third message of a random access procedure.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. NR, which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by an apparatus of a user equipment (UE). The method may include transmitting, to a base station, a first message of a random access procedure. The method may include receiving, from the base station, a second message of the random access procedure that indicates information for an uplink grant for a third message of the random access procedure, the information including a modulation and coding scheme (MCS) indication and a transmit power control (TPC) indication. The method may include transmitting, to the base station, one or more repetitions of a physical uplink shared channel (PUSCH) carrying the third message, where a repetition factor for the one or more repetitions is indicated by at least one of the MCS indication or the TPC indication.

Some aspects described herein relate to a method of wireless communication performed by an apparatus of a base station. The method may include receiving, from a UE, a first message of a random access procedure. The method may include transmitting, to the UE, a second message of the random access procedure that indicates information for an uplink grant for a third message of the random access procedure, the information including an MCS indication and a TPC indication. The method may include receiving, from the UE, one or more repetitions of a PUSCH carrying the third message, where a repetition factor for the one or more repetitions is indicated by at least one of the MCS indication or the TPC indication.

Some aspects described herein relate to an apparatus for wireless communication at a UE. The apparatus may include a memory. The apparatus may include one or more processors, coupled to the memory, configured to transmit, to a base station, a first message of a random access procedure. The one or more processors may be configured to receive, from the base station, a second message of the random access procedure that indicates information for an uplink grant for a third message of the random access procedure, the information including an MCS indication and a TPC indication. The one or more processors may be configured to transmit, to the base station, one or more repetitions of a PUSCH carrying the third message, where a repetition factor for the one or more repetitions is indicated by at least one of the MCS indication or the TPC indication.

Some aspects described herein relate to an apparatus for wireless communication at a base station. The apparatus may include a memory. The apparatus may include one or more processors, coupled to the memory, configured to receive, from a UE, a first message of a random access procedure. The one or more processors may be configured to transmit, to the UE, a second message of the random access procedure that indicates information for an uplink grant for a third message of the random access procedure, the information including an MCS indication and a TPC indication. The one or more processors may be configured to receive, from the UE, one or more repetitions of a PUSCH carrying the third message, where a repetition factor for the one or more repetitions is indicated by at least one of the MCS indication or the TPC indication.

Some aspects described herein relate to a non-transitory computer-readable medium that stores a set of instructions for wireless communication by a UE. The set of instructions, when executed by one or more processors of the UE, may cause the UE to transmit, to a base station, a first message of a random access procedure. The set of instructions, when executed by one or more processors of the UE, may cause the UE to receive, from the base station, a second message of the random access procedure that indicates information for an uplink grant for a third message of the random access procedure, the information including an MCS indication and a TPC indication. The set of instructions, when executed by one or more processors of the UE, may cause the UE to transmit, to the base station, one or more repetitions of a PUSCH carrying the third message, where a repetition factor for the one or more repetitions is indicated by at least one of the MCS indication or the TPC indication.

Some aspects described herein relate to a non-transitory computer-readable medium that stores a set of instructions for wireless communication by a base station. The set of instructions, when executed by one or more processors of the base station, may cause the base station to receive, from a UE, a first message of a random access procedure. The set of instructions, when executed by one or more processors of the base station, may cause the base station to transmit, to the UE, a second message of the random access procedure that indicates information for an uplink grant for a third message of the random access procedure, the information including an MCS indication and a TPC indication. The set of instructions, when executed by one or more processors of the base station, may cause the base station to receive, from the UE, one or more repetitions of a PUSCH carrying the third message, where a repetition factor for the one or more repetitions is indicated by at least one of the MCS indication or the TPC indication.

Some aspects described herein relate to an apparatus for wireless communication. The apparatus may include means for transmitting, to a base station, a first message of a random access procedure. The apparatus may include means for receiving, from the base station, a second message of the random access procedure that indicates information for an uplink grant for a third message of the random access procedure, the information including an MCS indication and a TPC indication. The apparatus may include means for transmitting, to the base station, one or more repetitions of a PUSCH carrying the third message, where a repetition factor for the one or more repetitions is indicated by at least one of the MCS indication or the TPC indication.

Some aspects described herein relate to an apparatus for wireless communication. The apparatus may include means for receiving, from a UE, a first message of a random access procedure. The apparatus may include means for transmitting, to the UE, a second message of the random access procedure that indicates information for an uplink grant for a third message of the random access procedure, the information including an MCS indication and a TPC indication. The apparatus may include means for receiving, from the UE, one or more repetitions of a PUSCH carrying the third message, where a repetition factor for the one or more repetitions is indicated by at least one of the MCS indication or the TPC indication.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be in noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 5A-5D are diagrams illustrating examples of tables used for indication of a repetition factor.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
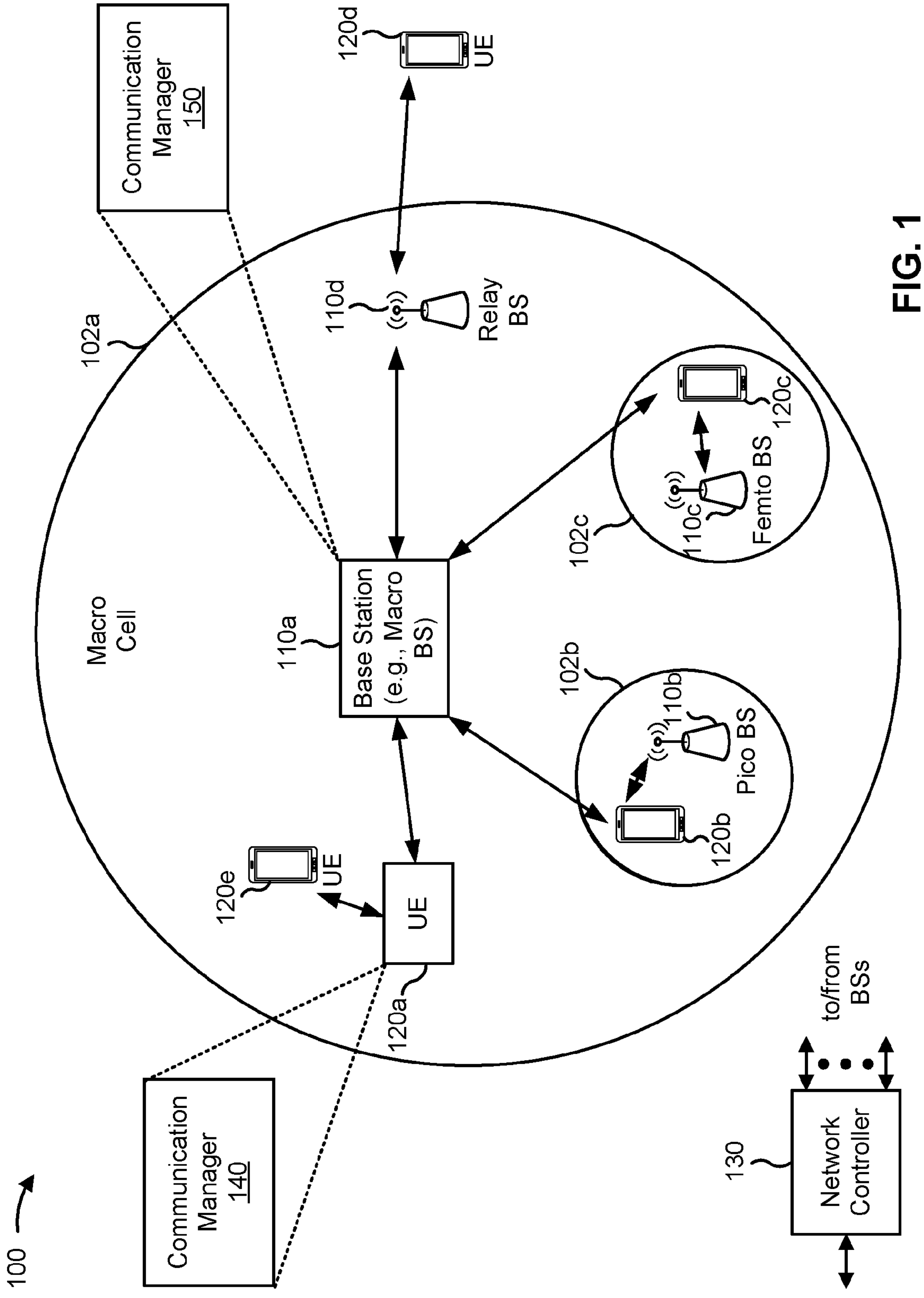
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110*a*, a BS 110*b*, a BS 110*c*, and a BS 110*d*), a user equipment (UE) 120 or multiple UEs 120 (shown as a UE 120*a*, a UE 120*b*, a UE 120*c*, a UE 120*d*, and a UE 120*e*), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110*a* may be a macro base station for a macro cell 102*a*, the BS 110*b* may be a pico base station for a pico cell 102*b*, and the BS 110*c* may be a femto base station for a femto cell 102*c*. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110*d* (e.g., a relay base station) may communicate with the BS 110*a* (e.g., a macro base station) and the UE 120*d* in order to facilitate communication between the BS 110*a* and the UE 120*d*. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE **120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110**.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHZ, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHZ), and FR5 (114.25 GHz-300 GHz). Each of these higher frequency bands falls within the EHF band.

With the above examples in mind, unless specifically stated otherwise, it should be understood that the term "sub-6 GHZ" or the like, if used herein, may broadly represent frequencies that may be less than 6 GHZ, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may transmit, to a base station, a first message of a random access procedure; receive, from the base station, a second message of the random access procedure that indicates information for an uplink grant for a third message of the random access procedure, the information including a modulation and coding scheme (MCS) indication and a transmit power control (TPC) indication; and transmit, to the base station, one or more repetitions of a physical uplink shared channel (PUSCH) carrying the third message, wherein a repetition factor for the one or more repetitions is indicated by at least one of the MCS indication or the TPC indication. Additionally, or alternatively, the communication manager 140 may perform one or more other operations described herein.

In some aspects, the base station 110 may include a communication manager 150. As described in more detail elsewhere herein, the communication manager 150 may receive, from a UE, a first message of a random access procedure; transmit, to the UE, a second message of the random access procedure that indicates information for an uplink grant for a third message of the random access procedure, the information including an MCS indication and a TPC indication; and receive, from the UE, one or more repetitions of a PUSCH carrying the third message, wherein a repetition factor for the one or more repetitions is indicated by at least one of the MCS indication or the TPC indication. Additionally, or alternatively, the communication manager 150 may perform one or more other operations described herein.

As indicated above, FIG. 1 is provided as an example. Other examples may differ from what is described with regard to FIG. 1.

Figure 2:
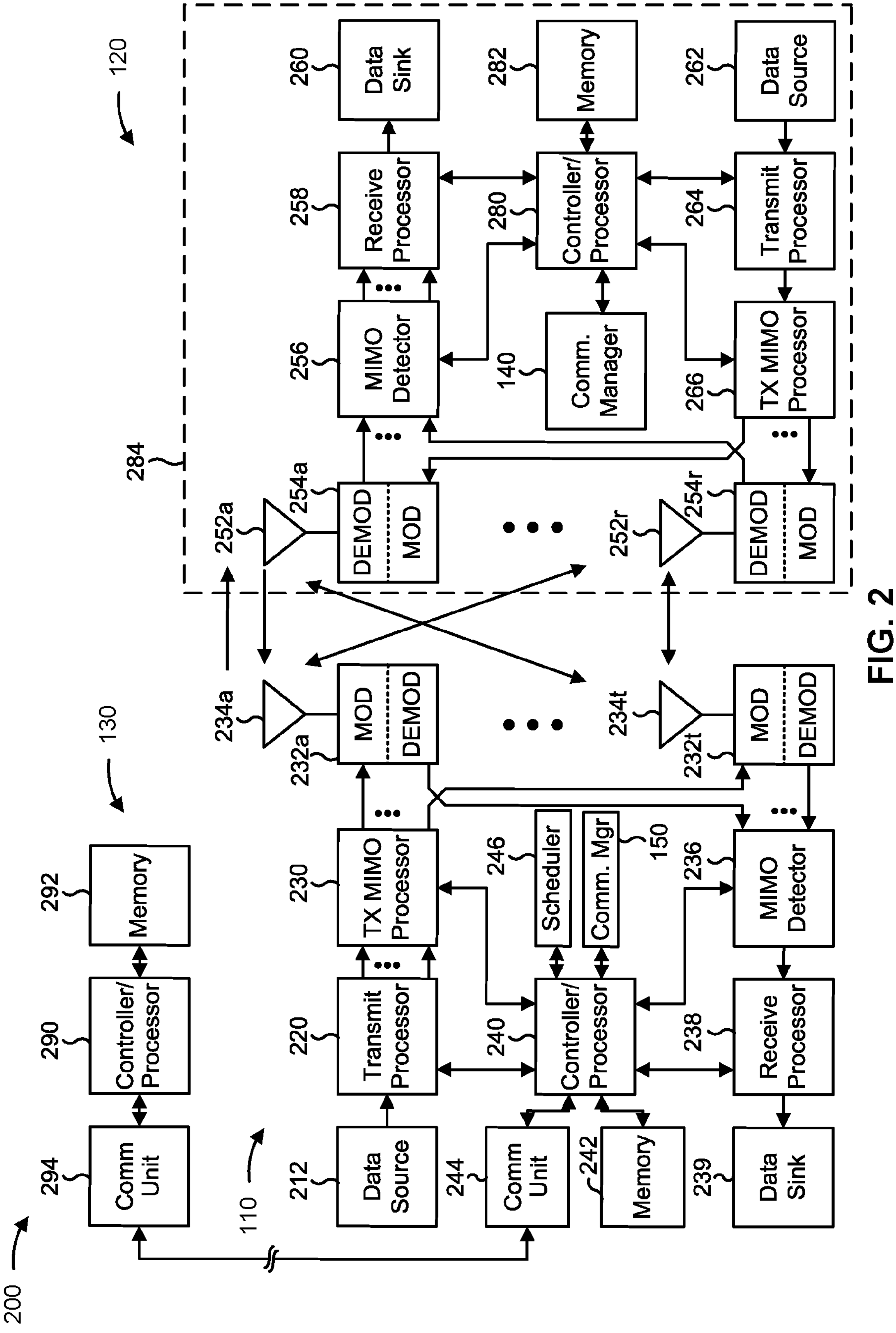
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234*a* through 234*t*, such as T antennas (T≥1). The UE 120 may be equipped with a set of antennas 252*a* through 252*r*, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The UE 120 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232*a* through 232*t*. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232*a* through 232*t* may transmit a set of downlink signals (e.g., T downlink signals) via a corresponding set of antennas 234 (e.g., T antennas), shown as antennas 234*a* through 234*t*.

At the UE 120, a set of antennas 252 (shown as antennas 252*a* through 252*r*) may receive the downlink signals from the base station 110 and/or other base stations 110 and may provide a set of received signals (e.g., R received signals) to a set of modems 254 (e.g., R modems), shown as modems 254*a* through 254*r*. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5A-5D, 6, 7, and 8).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244 The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem (s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5A-5D, 6, 7, and 8).

The controller/processor 240 of the base station 110, the controller/processor 280 of the UE 120, and/or any other component(s) of FIG. 2 may perform one or more techniques associated with indication of a repetition factor for a third message of a random access procedure, as described in more detail elsewhere herein. For example, the controller/processor 240 of the base station 110, the controller/processor 280 of the UE 120, and/or any other component(s) of FIG. 2 may perform or direct operations of, for example, process 700 of FIG. 7, process 800 of FIG. 8, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7, process 800 of FIG. 8, and/or other processes as described herein. In some examples, executing instructions may include running the instructions, converting the instructions, compiling the instructions, and/or interpreting the instructions, among other examples.

In some aspects, the UE includes means for transmitting, to a base station, a first message of a random access procedure; means for receiving, from the base station, a second message of the random access procedure that indicates information for an uplink grant for a third message of the random access procedure, the information including an MCS indication and a TPC indication; and/or means for transmitting, to the base station, one or more repetitions of a PUSCH carrying the third message, wherein a repetition factor for the one or more repetitions is indicated by at least one of the MCS indication or the TPC indication. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the base station includes means for receiving, from a UE, a first message of a random access procedure; means for transmitting, to the UE, a second message of the random access procedure that indicates information for an uplink grant for a third message of the random access procedure, the information including an MCS indication and a TPC indication; and/or means for receiving, from the UE, one or more repetitions of a PUSCH carrying the third message, wherein a repetition factor for the one or more repetitions is indicated by at least one of the MCS indication or the TPC indication. The means for the base station to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
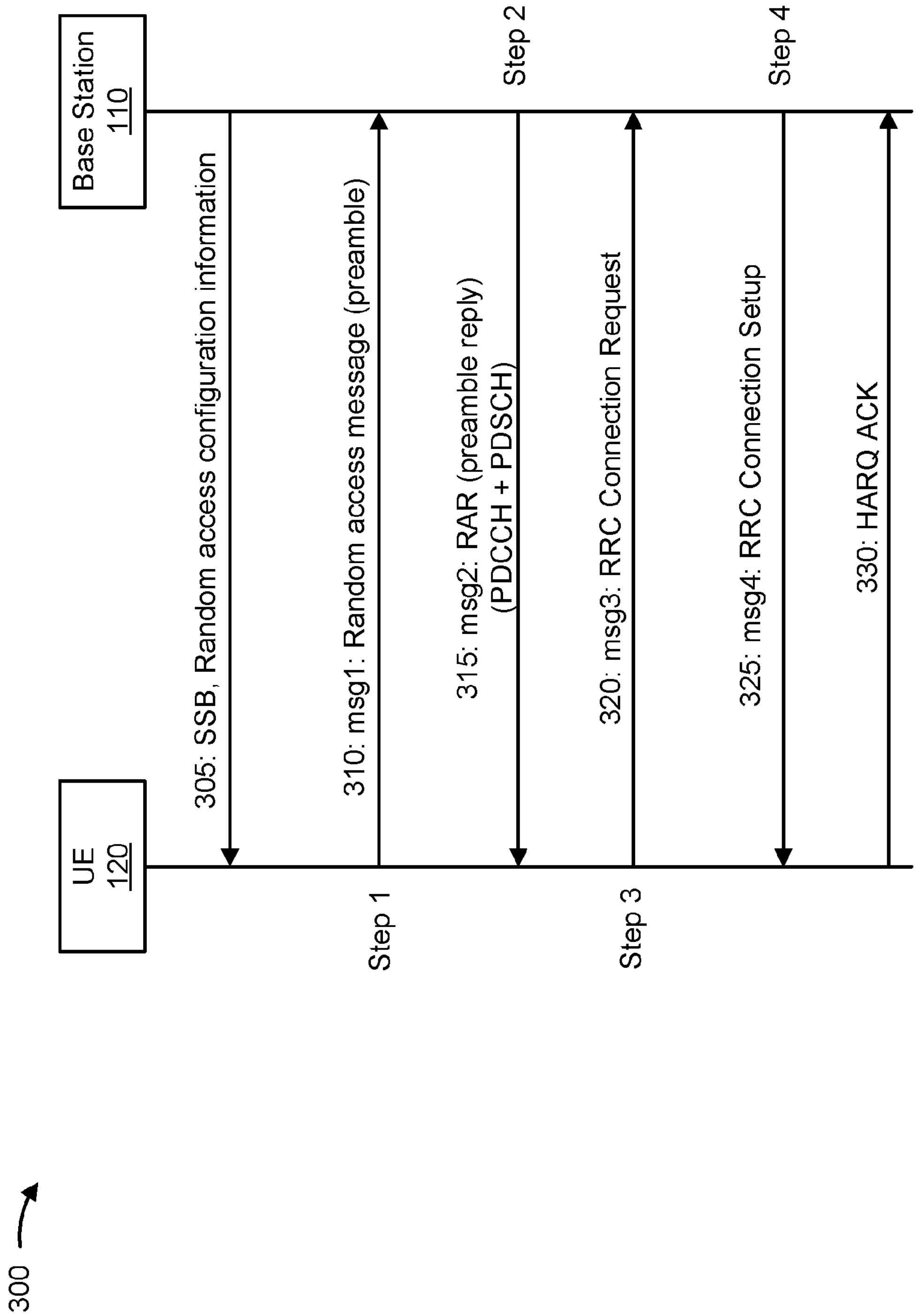
FIG. 3 is a diagram illustrating an example of a four-step random access procedure, in accordance with the present disclosure.

FIG. 3 is a diagram illustrating an example 300 of a four-step random access procedure (which may also be referred to as a four-step random access channel (RACH) procedure), in accordance with the present disclosure. As shown in FIG. 3, a base station 110 and a UE 120 may communicate with one another to perform the four-step random access procedure.

As shown by reference number 305, the base station 110 may transmit, and the UE 120 may receive, one or more synchronization signal blocks (SSBs) and random access configuration information. In some examples, the random access configuration information may be transmitted in and/or indicated by system information (e.g., in one or more system information blocks (SIBs)) and/or an SSB, such as for contention-based random access. Additionally, or alternatively, the random access configuration information may be transmitted in a radio resource control (RRC) message and/or a physical downlink control channel (PDCCH) order message that triggers a RACH procedure, such as for contention-free random access. The random access configuration information may include one or more parameters to be used in the random access procedure, such as one or more parameters for transmitting a random access message (RAM) and/or one or more parameters for receiving a random access response (RAR).

As shown by reference number 310, the UE 120 may transmit a RAM, which may include a preamble (sometimes referred to as a random access preamble, a physical RACH (PRACH) preamble, or a RAM preamble). The message that includes the preamble may be referred to as a message 1, msg1, MSG1, a first message, or an initial message in a four-step random access procedure. The RAM may include a random access preamble identifier. The UE 120 may transmit the RAM in a PRACH.

As shown by reference number 315, the base station 110 may transmit an RAR as a reply to the preamble. The message that includes the RAR may be referred to as message 2, msg2, MSG2, or a second message in a four-step random access procedure. In some examples, the RAR may indicate the detected random access preamble identifier (e.g., received from the UE 120 in msg1). Additionally, or alternatively, the RAR may indicate a resource allocation (e.g., an uplink grant) to be used by the UE 120 to transmit message 3 (msg3). Furthermore, the RAR may indicate a timing advance and/or a temporary cell radio network temporary identifier (TC-RNTI).

In some examples, as part of the second step of the four-step random access procedure, the base station 110 may transmit a PDCCH communication for the RAR. The PDCCH communication may schedule a physical downlink shared channel (PDSCH) communication that includes the RAR. For example, the PDCCH communication may include downlink control information (DCI) (e.g., in DCI format 1_0, and with a cyclic redundancy check (CRC) scrambled by a random access radio network temporary identifier (RA-RNTI) that indicates a resource allocation for the PDSCH communication. Also as part of the second step of the four-step random access procedure, the base station 110 may transmit the PDSCH communication for the RAR, as scheduled by the PDCCH communication. The RAR may be included in a medium access control (MAC) protocol data unit (PDU) of the PDSCH communication.

As shown by reference number 320, the UE 120 may transmit an RRC connection request message. The RRC connection request message may be referred to as message 3, msg3, MSG3, or a third message of a four-step random access procedure. In some aspects, the RRC connection request may include a UE identifier, uplink control information (UCI), a scheduling request, a buffer status, and/or an RRC connection request. The UE 120 may transmit the RRC connection request message in a PUSCH. If the base station 110 does not successfully receive the third message, the base station 110 may transmit a PDCCH communication that includes DCI (e.g., in DCI format 0_0, and with a CRC scrambled by the TC-RNTI) that schedules a PUSCH for retransmission of the third message.

The third message may create a bottleneck in the four-step random access procedure, particularly when multiple retransmissions are needed for successful delivery of the third message to the base station 110. This may increase a latency associated with the UE 120 obtaining initial access to a network. Moreover, in connection with transmission of the third message, the UE 120 receives the RAR that schedules the third message, as well as one or more PDCCH communications that schedule retransmissions of the third message. Thus, retransmission of the third message may cause significant PDCCH overhead.

In some examples, the UE 120 may transmit repetitions of the PUSCH carrying the third message to extend coverage of the third message. The UE 120 may transmit repetitions of a PUSCH carrying an initial transmission of the third message (i.e., the transmission scheduled by the DCI with the CRC scrambled by the RA-RNTI). Additionally, or alternatively, the UE 120 may transmit repetitions of a PUSCH carrying a retransmission of the third message (i.e., the transmission scheduled by the DCI with the CRC scrambled by the TC-RNTI).

In some examples, the UE 120 may transmit (e.g., after an initial access procedure) capability information that indicates whether the UE 120 supports repetition of a PUSCH carrying the third message. In some examples, the UE 120 may request (e.g., to the base station 110) to transmit the repetitions, and the base station 110 may indicate to the UE 120 a quantity of repetitions (e.g., if the base station 110 accepts the request). The UE 120 may transmit the request in separate PRACH resources (e.g., separate from PRACH resources used for messages of the random access procedure). For example, the UE 120 may transmit the request in a separate PRACH occasion, or using a separate PRACH preamble (e.g., in the case of shared PRACH occasions after SSB association). The UE 120 may transmit the request based at least in part on satisfaction of one or more conditions (e.g., a measured synchronization signal (SS)-RSRP satisfying a threshold, or the like). The base station 110 may receive the request and determine whether to schedule the repetitions for the UE 120. If the base station 110 determines to schedule the repetitions, the base station 110 may determine a quantity of the repetitions (e.g., 1, 2, 3, 4, 7, 8, 12, or 16 repetitions) that the UE 120 is to transmit. The quantity of repetitions may be referred to herein as a "repetition factor."

In some examples, one or more bit fields of a random access message may be repurposed to indicate the repetition factor. That is, a value of the one or more fields may indicate the repetition factor in addition to indicating the information that the one or more fields are intended to convey. For example, one or more (e.g., two) fields for an uplink grant in the RAR (e.g., that schedules the PUSCH for the third message) may provide an indication of a quantity of repetitions of the PUSCH carrying the third message (e.g., an initial transmission of the third message). The one or more fields may include a time-domain resource allocation (TDRA) field (e.g., in connection with a TDRA table that indicates, for a TDRA indicator, a TDRA and a repetition factor), an MCS field (e.g., that uses 4 bits), a TPC field (e.g., that uses 3 bits), a channel state information (CSI) request field, and/or a frequency-domain resource allocation (FDRA) field. The MCS field may indicate an MCS index (e.g., a value of 0-15), and the TPC field may indicate a TPC command (e.g., a value of 0-7).

Additionally, or alternatively, one or more bit fields in DCI may be repurposed to indicate the repetition factor. For example, one or more (e.g., two) fields in DCI (e.g., in format 0_0 with a CRC scrambled by a TC-RNTI) that schedules retransmission of the third message may provide an indication of a quantity of repetitions of a PUSCH carrying the third message (e.g., a retransmission of the third message). The one or more fields may include a TDRA field (as described above), an MCS field (e.g., that uses 5 bits), a TPC field (e.g., that uses 2 bits), an FDRA field, and/or a hybrid automatic repeat request (HARQ) process number indication.

The UE 120 may store, may be configured with, or may otherwise be provisioned with, one or more tables (e.g., interpretation tables, lookup tables, or the like) used for interpreting an MCS index and/or a TPC command. For example, the one or more tables may include a first MCS table used for PUSCH with CP-OFDM and a second MCS table used for PUSCH with DFT-s-OFDM. An MCS table may identify associations between MCS indices, modulation orders, target code rates, and spectral efficiencies. As another example, the one or more tables may include a TPC table. A TPC table may identify associations between TPC commands and TPC values (e.g., in decibels (dB)) indicating an increase or a decrease to transmit power.

In some examples, the UE 120 may store, may be configured with, or may otherwise be provisioned with, one or more tables (e.g., interpretation tables, lookup tables, or the like) used for interpreting a repurposed MCS index and/or a repurposed TPC command. For example, the one or more tables may include a TPC table that identifies associations between TPC commands, TPC values, and repetition factors. In some cases, less than all possible repetition factors may be mapped to TPC commands in the TPC table, and the TPC values that can be configured for a repetition may be limited using the TPC table. In some other cases, all possible repetition factors may be mapped to TPC commands in the TPC table; however, only a single TPC value can be configured for a repetition using the TPC table. As another example, the one or more tables may include an MCS table that identifies associations between MCS indices, particular MCSs (e.g., particular MCSs associated with a legacy MCS table, such as the first MCS table or the second MCS table, described above), and repetition factors. For example, each MCS index may be associated with either a first MCS or a second MCS (e.g., a first legacy MCS or a second legacy MCS).

When the UE 120 has requested to transmit repetitions of a PUSCH carrying the third message (e.g., an initial transmission of the third message), configuring the UE 120 with an MCS associated with a relatively low modulation order and/or with a non-negative TPC value (e.g., a transmit power increase) may be suitable. However, repurposing of an MCS field or a TPC field, as described above, may reduce the scheduling flexibility available to the base station 110. For example, the TPC values that can be configured for the UE 120 may be limited, or the MCSs that can be configured for the UE 120 may be limited, as described above.

Some techniques and apparatuses described herein provide for indication of a repetition factor for the third message with improved scheduling flexibility. For example, in some aspects, an MCS indication (e.g., an MCS index of an MCS field) and a TPC indication (e.g., a TPC command of a TPC field) associated with an uplink grant for the third message may jointly indicate a repetition factor for the third message. That is, the MCS indication and the TPC indication may be repurposed to jointly indicate the repetition factor. In some aspects, the MCS indication alone may indicate a repetition factor for the third message. Here, MCS indications may be associated with (e.g., in a table) a subset of a set of possible repetition factors. Use of the MCS indication and/or the TPC indication to al so indicate a repetition factor reduces signaling overhead. Moreover, the techniques and apparatuses described herein enable improved scheduling flexibility for the base station 110, thereby improving a performance of the third message and decreasing a latency associated with the UE 120 obtaining initial access to a network.

As shown by reference number 325, the base station 110 may transmit an RRC connection setup message. The RRC connection setup message may be referred to as message 4, msg4, MSG4, or a fourth message of a four-step random access procedure. In some aspects, the RRC connection setup message may include the detected UE identifier, a timing advance value, and/or contention resolution information. In some examples, as part of the fourth step of the four-step random access procedure, the base station 110 may transmit a PDCCH communication for the RRC connection setup message. The PDCCH communication may schedule a PDSCH communication that includes the RRC connection setup message. For example, the PDCCH communication may indicate a resource allocation for the PDSCH communication. Also, as part of the fourth step of the four-step random access procedure, the base station 110 may transmit the PDSCH communication for the RRC connection setup message, as scheduled by the PDCCH communication. As shown by reference number 330, if the UE 120 successfully receives the RRC connection setup message, the UE 120 may transmit HARQ acknowledgment (ACK).

As indicated above, FIG. 3 is provided as an example. Other examples may differ from what is described with regard to FIG. 3.

Figure 4:
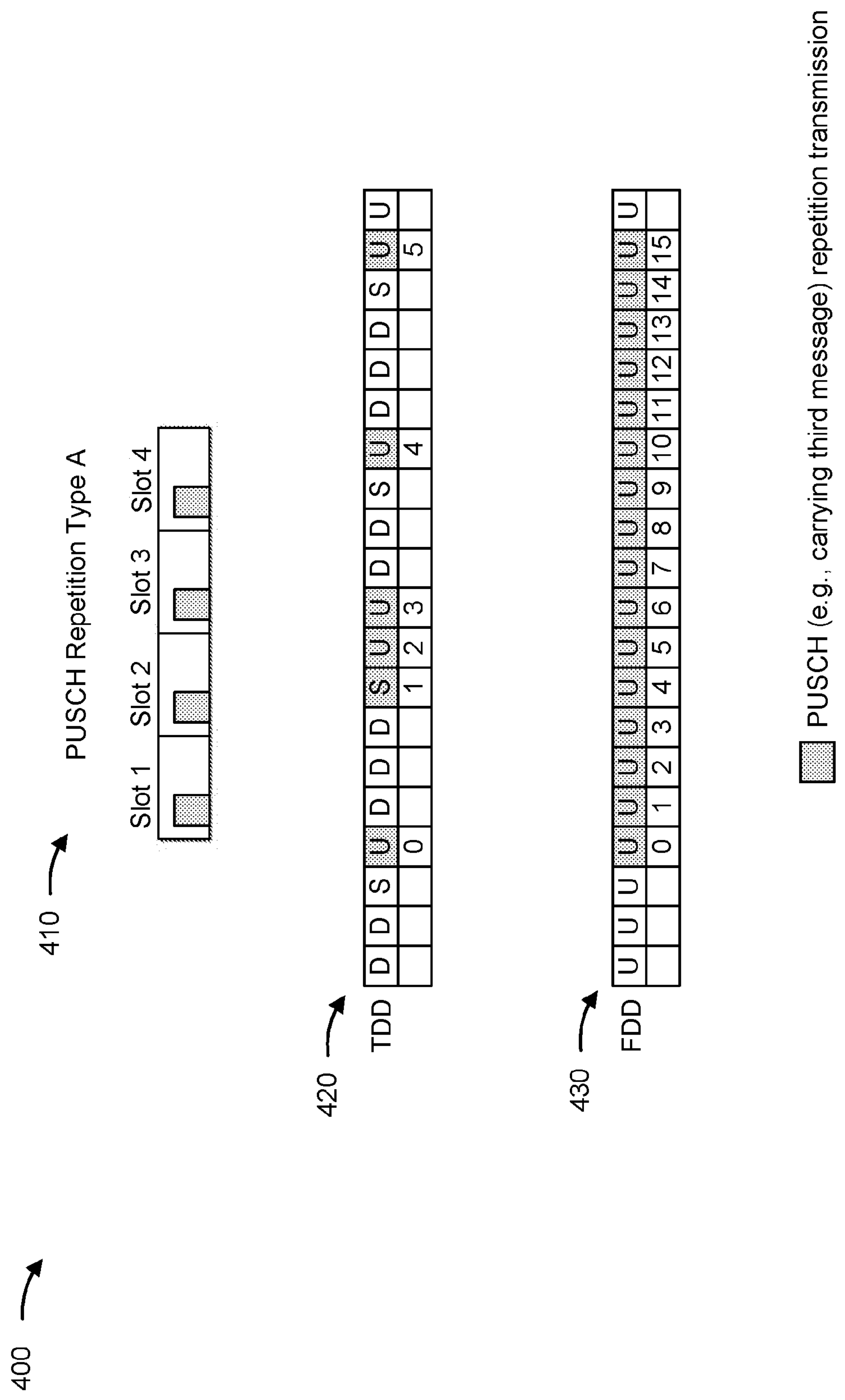
FIG. 4 is a diagram illustrating an example of physical uplink share channel (PUSCH) repetition, in accordance with the present disclosure.

FIG. 4 is a diagram illustrating an example 400 of PUSCH repetition, in accordance with the present disclosure. Although techniques are described herein in connection with PUSCH repetitions, these techniques can be applied to various types of uplink repetitions, such as an uplink data repetition, an uplink control repetition (e.g., a physical uplink control channel (PUCCH) repetition), or the like.

A repetition, such as an uplink repetition or a downlink repetition, may be used to improve reliability, such as for ultra reliable low latency communication (URLLC) or for UEs 120 located in a geographic area with poor channel conditions (e.g., a cell edge). When repetitions are used, a transmitter repeats transmission of a communication multiple times. For example, a UE 120 may transmit an initial uplink communication and may repeat transmission of (e.g., may retransmit) that uplink communication one or more times. When a UE 120 is configured with repetitions, the UE 120 may retransmit an initial transmission without first receiving feedback (e.g., ACK or negative ACK (NACK)) indicating whether the initial transmission was successfully received.

In some aspects, a repeated transmission (sometimes referred to as a retransmission) may include the exact same encoded bits (e.g., information bits and parity bits) as the initial transmission and/or as another repeated transmission (e.g., where a same redundancy version is used across repetitions). Alternatively, a repeated transmission may include different encoded bits (e.g., a different combination of information bits and/or parity bits) than the initial transmission and/or another repeated transmission (e.g., where different redundancy versions are used across repetitions).

As used herein, the term “repetition” is used to refer to the initial communication and is also used to refer to a repeated transmission of the initial communication. For example, if the UE 120 is configured to transmit four repetitions, then the UE 120 may transmit an initial transmission and may transmit three repeated transmissions of that initial transmission. Thus, each transmission (regardless of whether the transmission is an initial transmission or a retransmission) is counted as a repetition. A repetition may be transmitted in a transmission occasion, which is sometimes referred to as a transmission instance.

As shown by reference number 410, for an uplink repetition type referred to as PUSCH Repetition Type A, uplink transmission occasions are not permitted to cross a slot boundary, and only one uplink transmission occasion is permitted per slot. Thus, if a UE 120 is configured with PUSCH Repetition Type A, then the UE 120 cannot transmit a repetition in a set of symbols that occurs in more than one slot, and can only transmit the repetition if all symbols of the repetition occur in the same slot. Furthermore, if a UE 120 is configured with PUSCH Repetition Type A, then the UE 120 cannot transmit more than one repetition per slot. Thus, for PUSCH Repetition Type A, a transmission occasion corresponds to a slot. Furthermore, for PUSCH Repetition Type A, the time domain allocation for a repetition (e.g., of a PUSCH carrying the same transport block) within a slot (e.g., a slot available for uplink transmission) may be the same across all slots for which repetitions are scheduled. In other words, each repetition, associated with the same initial transmission, may start in the same starting symbol (e.g., having the same starting symbol index) in each slot in which a repetition is scheduled and may occupy the same number of symbols (e.g., may have the same transmission duration).

Reference number 420 shows an example of PUSCH repetition counting in connection with time division duplexing (TDD). In TDD, repetitions are transmitted in slots available for uplink transmission, and the repetitions are counted according to the available slots. For example, in TDD, a UE 120 may transmit a repetition in an available uplink slot (shown as “U”) or in an available special slot (shown as “S”) that includes one or more uplink symbols, one or more downlink symbols, and/or one or more flexible symbols (which may be used for uplink transmission or downlink transmission). However, the UE 120 may not transmit a repetition in a downlink slot (shown as “D”).

Reference number 430 shows an example of PUSCH repetition counting in connection with frequency division duplexing (FDD). In FDD, each slot may include an uplink frequency region (shown as "U") and a downlink frequency region (not shown). Thus, in FDD, each slot may be available for uplink transmission, and repetitions are counted according to the available slots. For example, in FDD, a UE 120 may transmit a repetition in each slot using the uplink frequency region.

As described above, a UE 120 may transmit repetitions of a PUSCH carrying a third message of a four-step random access procedure. In some aspects, the repetitions may be according to PUSCH Repetition Type A.

As indicated above, FIG. 4 is provided as an example. Other examples may differ from what is described with respect to FIG. 4.

Figure 5A:
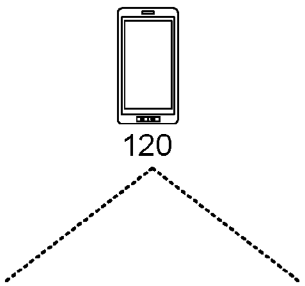

FIG. 5A is a diagram illustrating an example 500 of tables used for indication of a repetition factor. As shown in FIG. 5A, a UE 120 may store, may be configured with, or may otherwise be provisioned with, an MCS table 505 (i.e., a first table) and a TPC table 510 (i.e., a second table). Additionally, a base station 110 (not shown in FIG. 5A) may also store information identifying the MCS table 505 and the TPC table 510. As used herein, "table" may refer to information that identifies associations between values.

The MCS table 505 may indicate associations between a plurality of MCS indications (e.g., MCS indices), a plurality of MCSs, and a plurality of repetition factors. In the MCS table 505, the plurality of MCSs are identified as "a," "b," or "c." Here, "a," "b," and "c" each refer to a respective MCS associated with a particular modulation order, a particular target code rate, and a particular spectral efficiency. For example, each may refer to a particular MCS of a legacy MCS table (e.g., that is not repurposed). As an example, "a," "b," and "c" may refer to legacy MCS indices 0, 1, and 2, respectively. The TPC table 510 may indicate associations between a plurality of TPC indications (e.g., TPC commands), a plurality of TPC values (e.g., in dBs), and the plurality of repetition factors. In the second table, "full power" indicates that the UE 120 is to transmit at a maximum allowed transmit power for the UE 120.

In the MCS table 505, different repetition factors may be mapped to a same quantity of MCS indications (e.g., same-sized subsets of the MCS field). For example, a first repetition factor and a second repetition factor may be respectively associated with a same quantity of MCS indications. As an example, repetition factor 2 may be associated with MCS indices 3-5 (that is, 3 MCS indications), and repetition factor 4 may be associated with MCS indices 9-11 (that is, 3 MCS indications). Similarly, in the TPC table 510, different repetition factors may be mapped to a same quantity of TPC indications (e.g., same-sized subsets of the TPC field). For example, a first repetition factor and a second repetition factor may be respectively associated with a same quantity of TPC indications. As an example, repetition factor 8 may be associated with TPC command 000 (that is, 1 TPC indication), and repetition factor 16 may be associated with TPC command 010 (that is, 1 TPC indication).

As shown in FIG. 5A, and described in more detail below, a first set of the plurality of repetition factors (e.g., 1, 2, 3, 4, and 7) can be indicated using the MCS table 505, while the MCS table 505 does not enable indication of a particular repetition factor of a second set of the plurality of repetition factors (e.g., 8, 12, and 16). Similarly, the second set of the plurality of repetition factors (e.g., 8, 12, and 16) can be indicated using the TPC table 510, while the TPC table 510 does not enable indication of a particular repetition factor of the first set of the plurality of repetition factors (e.g., 1, 2, 3, 4, and 7).

As indicated above, FIG. 5A is provided as an example. Other examples may differ from what is described with respect to FIG. 5A.

FIG. 5B is a diagram illustrating an example 520 of tables used for indication of a repetition factor. As shown in FIG. 5B, a UE 120 may store, may be configured with, or may otherwise be provisioned with, an MCS table 525 (i.e., a first table) and a TPC table 530 (i.e., a second table). Additionally, a base station 110 (not shown in FIG. 5B) may also store information identifying the MCS table 525 and the TPC table 530.

The MCS table 525 may indicate associations between a plurality of MCS indications (e.g., MCS indices), a plurality of MCSs, and a plurality of repetition factors, in a similar manner as described above. The TPC table 530 may indicate associations between a plurality of TPC indications (e.g., TPC commands), a plurality of TPC values (e.g., in dBs), and the plurality of repetition factors, in a similar manner as described above.

In the MCS table 525, different repetition factors may be mapped to a different quantity of MCS indications (e.g., different-sized subsets of the MCS field). For example, a first repetition factor and a second repetition factor may be respectively associated with different quantities of MCS indications. As an example, repetition factor 2 may be associated with MCS indices 3-5 (that is, 3 MCS indications), and repetition factor 4 may be associated with MCS indices 8-9 (that is, 2 MCS indications). Similarly, in the TPC table 530, different repetition factors may be mapped to a different quantity of TPC indications (e.g., different-sized subsets of the TPC field). For example, a first repetition factor and a second repetition factor may be respectively associated with a different quantity of TPC indications. As an example, repetition factor 12 may be associated with TPC commands 000 and 001 (that is, 2 TPC indications), and repetition factor 16 may be associated with TPC command 010 (that is, 1 TPC indication).

As shown in FIG. 5B, and described in more detail below, a first set of the plurality of repetition factors (e.g., 1, 2, 3, 4, 7, and 8) can be indicated using the MCS table 525, while the MCS table 525 does not enable indication of a particular repetition factor of a second set of the plurality of repetition factors (e.g., 12 and 16). Similarly, the second set of the plurality of repetition factors (e.g., 12 and 16) can be indicated using the TPC table 530, while the TPC table 530 does not enable indication of a particular repetition factor of the first set of the plurality of repetition factors (e.g., 1, 2, 3, 4, 7, and 8).

As indicated above, FIG. 5B is provided as an example. Other examples may differ from what is described with respect to FIG. 5B.

Figure 5C:
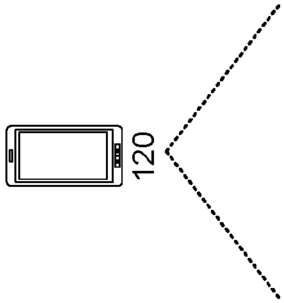

FIG. 5C is a diagram illustrating an example 540 of tables used for indication of a repetition factor. As shown in FIG. 5C, a UE 120 may store, may be configured with, or may otherwise be provisioned with, an MCS table 545 and/or an MCS table 550. Additionally, a base station 110 (not shown in FIG. 5C) may also store information identifying the MCS table 545 and/or the MCS table 550.

The MCS table 545 and the MCS table 550 may respectively indicate associations between a plurality of MCS indications (e.g., MCS indices), a plurality of MCSs, and a plurality of repetition factors, in a similar manner as described above. In the MCS table 545 and the MCS table 550, different repetition factors may be mapped to a same quantity of MCS indications (e.g., the repetition factors are uniformly mapped to MCS indications), in a similar manner as described above. In MCS table 545, all repetition factors of a set of possible repetition factors (e.g., 1, 2, 3, 4, 7, 8, 12, and 16) may be associated with MCS indications (e.g., MCS indices). In MCS table 550, a subset (e.g., a proper subset) of the set of possible repetition factors (e.g., 1, 2, 4, and 8) may be associated with MCS indications (e.g., MCS indices), thereby enhancing scheduling flexibility.

As indicated above, FIG. 5C is provided as an example. Other examples may differ from what is described with respect to FIG. 5C.

Figure 5D:
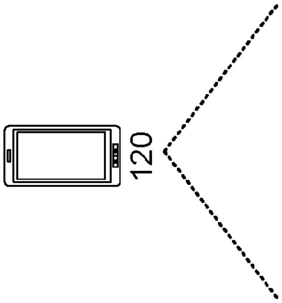

FIG. 5D is a diagram illustrating an example 560 of tables used for indication of a repetition factor. As shown in FIG. 5D, a UE 120 may store, may be configured with, or may otherwise be provisioned with, an MCS table 565 and/or an MCS table 570. Additionally, a base station 110 (not shown in FIG. 5D) may also store information identifying the MCS table 565 and/or the MCS table 570.

The MCS table 565 and the MCS table 570 may respectively indicate associations between a plurality of MCS indications (e.g., MCS indices), a plurality of MCSs, and a plurality of repetition factors, in a similar manner as described above. In the MCS table 565 and the MCS table 570, different repetition factors may be mapped to different quantities of MCS indications (e.g., the repetition factors are non-uniformly mapped to MCS indications), in a similar manner as described above. In MCS table 565, all repetition factors of a set of possible repetition factors may be associated with MCS indications (e.g., MCS indices). In MCS table 570, a subset (e.g., a proper subset) of the set of possible repetition factors may be associated with MCS indications (e.g., MCS indices), thereby enhancing scheduling flexibility.

As indicated above, FIG. 5D is provided as an example. Other examples may differ from what is described with respect to FIG. 5D.

Figure 6:
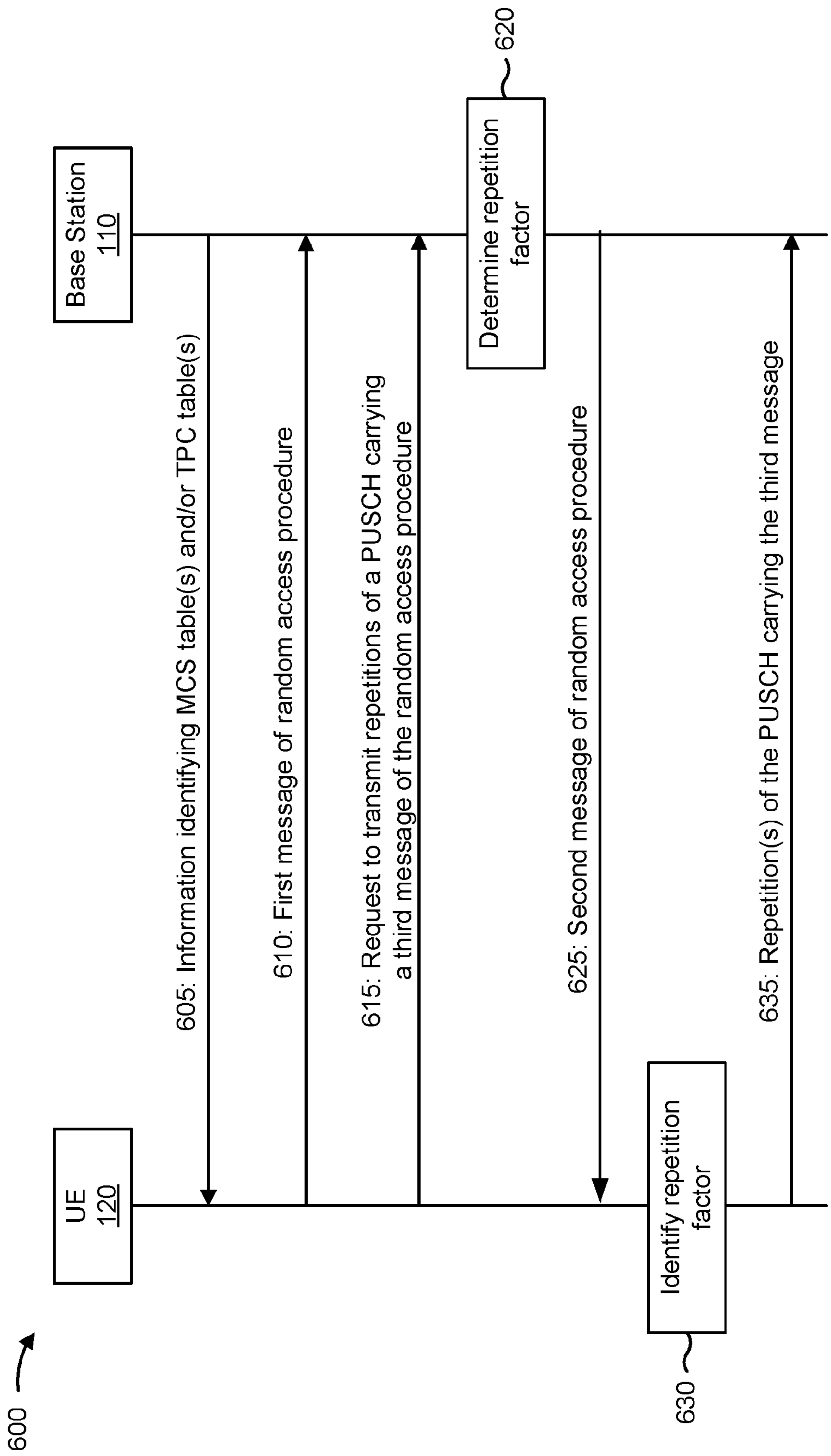
FIG. 6 is a diagram illustrating an example associated with indication of a repetition factor for a third message of a random access procedure, in accordance with the present disclosure.

FIG. 6 is a diagram illustrating an example 600 of indication of a repetition factor for a third message of a random access procedure, in accordance with the present disclosure. As shown in FIG. 6, a base station 110 and a UE 120 may communicate with one another. For example, the base station 110 and the UE 120 may communicate in connection with a random access procedure, as describe above. The random access procedure may be a four-step random access procedure, as described above.

As shown by reference number 605, the base station may transmit, and the UE 120 may receive, information that identifies one or more MCS tables and/or one or more TPC tables that are to be used by the UE 120. The one or more MCS tables may correspond to MCS table 505, MCS table 525, MCS table 545, MCS table 550, MCS table 565, and/or MCS table 570, as described above in connection with FIGS. 5A-5D. The one or more TPC tables may correspond to TPC table 510 and/or TPC table 530, as described above in connection with FIGS. 5A-5B. In some aspects, the information may be included in system information transmitted by the base station 110. In some aspects, the information may be included in an RRC message transmitted by the base station 110. In this way, the base station 110 may configure an MCS and/or a TPC for the UE 120 with greater flexibility.

As shown by reference number 610, the UE 120 may transmit, and the base station 110 may receive, a first message of a random access procedure (e.g., a four-step random access procedure), as described above. The first message may include a random access preamble, as described above. As shown by reference number 615, the UE 120 may transmit, and the base station 110 may receive, a request to transmit repetitions of a PUSCH carrying a third message of the random access procedure, as described above.

As shown by reference number 620, the base station 110 may determine a repetition factor for the PUSCH carrying the third message. For example, if the base station 110 determines to schedule the repetitions (e.g., if the base station 110 accepts the request of the UE 120), then the base station 110 may determine the repetition factor for the repetitions. The repetition factor (i.e., a quantity of repetitions) may be 1, 2, 3, 4, 7, 8, 12, 16, or the like, which may identify a set of possible repetition factors. Based at least in part on determining the repetition factor, the base station 110 may select an MCS indication and/or a TPC indication that also indicates the repetition factor. For example, the base station 110 may select the MCS indication and/or the TPC indication using one or more of the tables described above in connection with FIGS. 5A-5D.

As shown by reference number 625, the base station 110 may transmit, and the UE 120 may receive, a second message of the random access procedure, as described above. The base station 110 may transmit the second message in response to receiving the first message. The second message may include an RAR, as described above. For example, the second message may indicate information for an uplink grant (e.g., a resource allocation) for a third message of the random access procedure. The information may include the MCS indication (e.g., an MCS index) and the TPC indication (e.g., a TPC command). Additionally, the information may include a frequency hopping indication, an FDRA, a TDRA, a CSI request indication, and/or a channel access type and CP extension indication.

As described above, at least one of the MCS indication or the TPC indication may also indicate (e.g., in addition to indicating an MCS or a TPC value, respectively) a repetition factor for repetitions of the PUSCH carrying the third message (e.g., for an initial transmission of the third message). That is, the MCS indication and/or the TPC indication may be repurposed, as described above, to also indicate the repetition factor.

As shown by reference number 630, the UE 120 may identify the repetition factor for the PUSCH carrying the third message based at least in part on the MCS indication and/or the TPC indication. For example, the UE 120 may identify the repetition factor using at least one of a first table that indicates associations between a plurality of MCS indications, a plurality of MCSs, and a plurality of repetition factors (e.g., a first set of the plurality of repetition factors), or a second table that indicates associations between a plurality of TPC indications, a plurality of TPC values, and the plurality of repetition factors (e.g., a second set of the plurality of repetition factors). As an example, the first table may correspond to MCS table 505 or MCS table 525, and the second table may correspond to TPC table 510 or TPC table 530, as described above.

In some aspects, the MCS indication and the TPC indication may jointly indicate the repetition factor. For example, the repetition factor may be indicated by the MCS indication if the repetition factor satisfies (e.g., is less than) a threshold, and the repetition factor may be indicated by the TPC indication if the repetition factor does not satisfy (e.g., is greater than) the threshold. In other words, the UE 120 may use the first table to identify a repetition factor from a first set of the plurality of repetition factors, and the UE 120 may use the second table to identify a repetition factor from a second set of the plurality of repetition factors. For example, if the repetition factor satisfies the threshold, then the UE 120 may use the first table to identify the repetition factor, and if the repetition factor does not satisfy the threshold, then the UE 120 may use the second table to identify the repetition factor. For the tables 505, 510 shown in FIG. 5A, the threshold is 8. For the tables 525, 530 shown in FIG. 5B, the threshold is 12. Thus, as an example using the tables 505, 510 of FIG. 5A, if the MCS indication is 15 and the TPC indication is 001, then the MCS table 505 may indicate that the repetition factor is indicated by the TPC table 510, and the TPC table 510 may indicate that the repetition factor is 12. In this way, a robust set of repetition factors (e.g., all possible repetition factors) may be indicated while improving scheduling flexibility in connection with an MCS and a TPC value.

In some aspects, the MCS indication (e.g., alone, without the TPC indication) may indicate the repetition factor. For example, the UE 120 may identify the repetition factor using a table that indicates associations between a plurality of MCS indications, a plurality of MCSs, and a plurality of repetition factors (e.g., without using another table). For example, the table may correspond to MCS table 545, MCS table 550, MCS table 565, or MCS table 570. Thus, as an example using MCS table 545 of FIG. 5C, if the MCS indication is 9, then the MCS table 545 may indicate that the repetition factor is 7. In some aspects, the plurality of repetition factors indicated by the table include a subset (e.g., a proper subset) of a set of possible repetition factors. In this way, scheduling flexibility in connection with an MCS is improved.

As shown by reference number 635, the UE 120 may transmit, and the base station 110 may receive, one or more repetitions of the PUSCH carrying the third message. The UE 120 may transmit the one or more repetitions in accordance with the repetition factor that is indicated by the MCS indication and/or the TPC indication. In other words, a quantity of repetitions transmitted by the UE 120 corresponds to the repetition factor. As described above, a first transmission of the PUSCH carrying the third message may be counted as a repetition. Thus, if the repetition factor as 1, then the UE 120 may perform a single transmission of the PUSCH carrying the third message; if the repetition factor is 2, then the UE 120 may perform two transmissions of the PUSCH carrying the third message; and so forth. The UE 120 may transmit the one or more repetitions in accordance with the uplink grant (e.g., the resource allocation) of the second message (e.g., using the symbol allocation indicated by the uplink grant for each slot in which a repetition is transmitted).

As indicated above, FIG. 6 is provided as an example. Other examples may differ from what is described with respect to FIG. 6.

Figure 7:
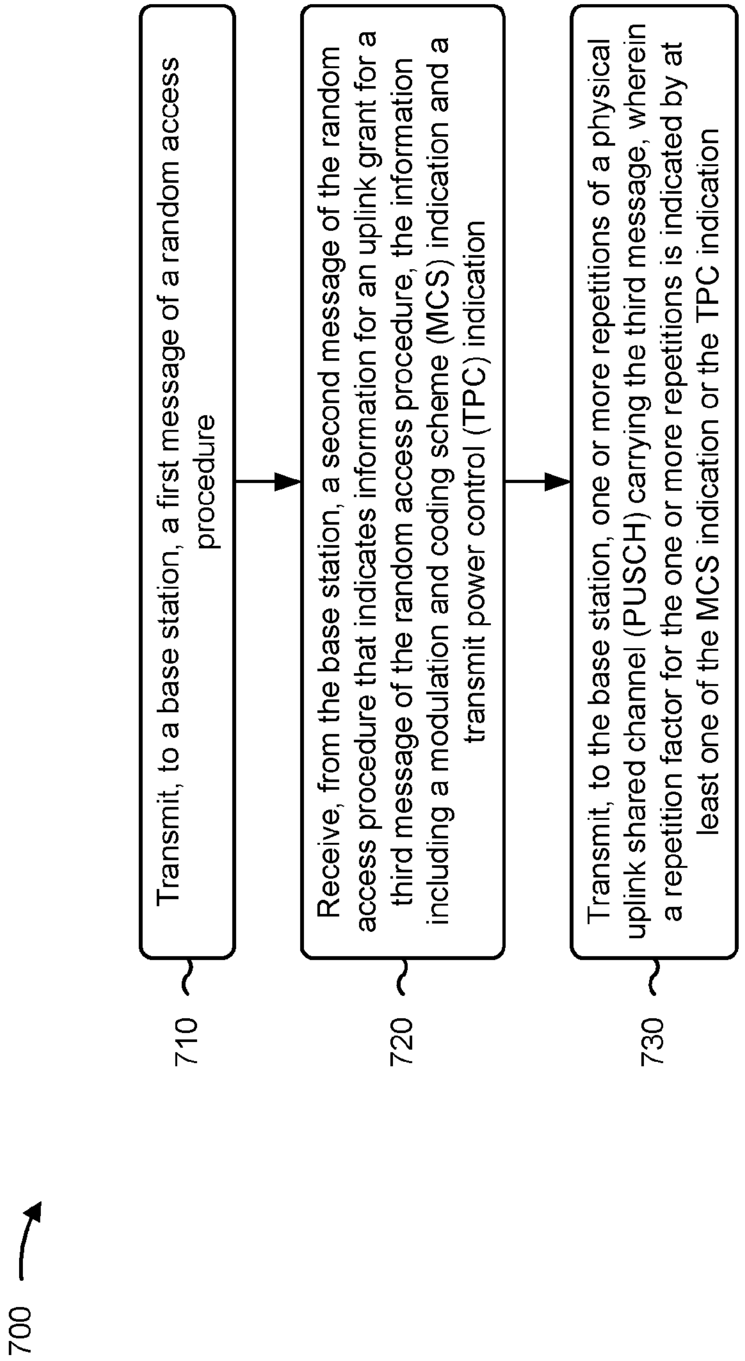
FIGS. 7-8 are diagrams illustrating example processes associated with indication of a repetition factor for a third message of a random access procedure, in accordance with the present disclosure.

FIG. 7 is a diagram illustrating an example process 700 performed, for example, by a UE, in accordance with the present disclosure. Example process 700 is an example where the UE (e.g., UE 120) performs operations associated with indication of a repetition factor for a third message of a random access procedure.

As shown in FIG. 7, in some aspects, process 700 may include transmitting, to a base station, a first message of a random access procedure (block 710). For example, the UE (e.g., using communication manager 140 and/or transmission component 904, depicted in FIG. 9) may transmit, to a base station, a first message of a random access procedure, as described above.

As further shown in FIG. 7, in some aspects, process 700 may include receiving, from the base station, a second message of the random access procedure that indicates information for an uplink grant for a third message of the random access procedure, the information including an MCS indication and a TPC indication (block 720). For example, the UE (e.g., using communication manager 140 and/or reception component 902, depicted in FIG. 9) may receive, from the base station, a second message of the random access procedure that indicates information for an uplink grant for a third message of the random access procedure, the information including an MCS indication and a TPC indication, as described above.

As further shown in FIG. 7, in some aspects, process 700 may include transmitting, to the base station, one or more repetitions of a PUSCH carrying the third message, wherein a repetition factor for the one or more repetitions is indicated by at least one of the MCS indication or the TPC indication (block 730). For example, the UE (e.g., using communication manager 140 and/or transmission component 904, depicted in FIG. 9) may transmit, to the base station, one or more repetitions of a PUSCH carrying the third message, wherein a repetition factor for the one or more repetitions is indicated by at least one of the MCS indication or the TPC indication, as described above.

Process 700 may include additional aspects, such as any single aspect or any combination of aspects described below and/or in connection with one or more other processes described elsewhere herein.

In a first aspect, the MCS indication and the TPC indication jointly indicate the repetition factor for the one or more repetitions.

In a second aspect, alone or in combination with the first aspect, the repetition factor for the one or more repetitions is indicated by the MCS indication if the repetition factor for the one or more repetitions satisfies a threshold, and the repetition factor for the one or more repetitions is indicated by the TPC indication if the repetition factor for the one or more repetitions does not satisfy the threshold.

Figure 9:
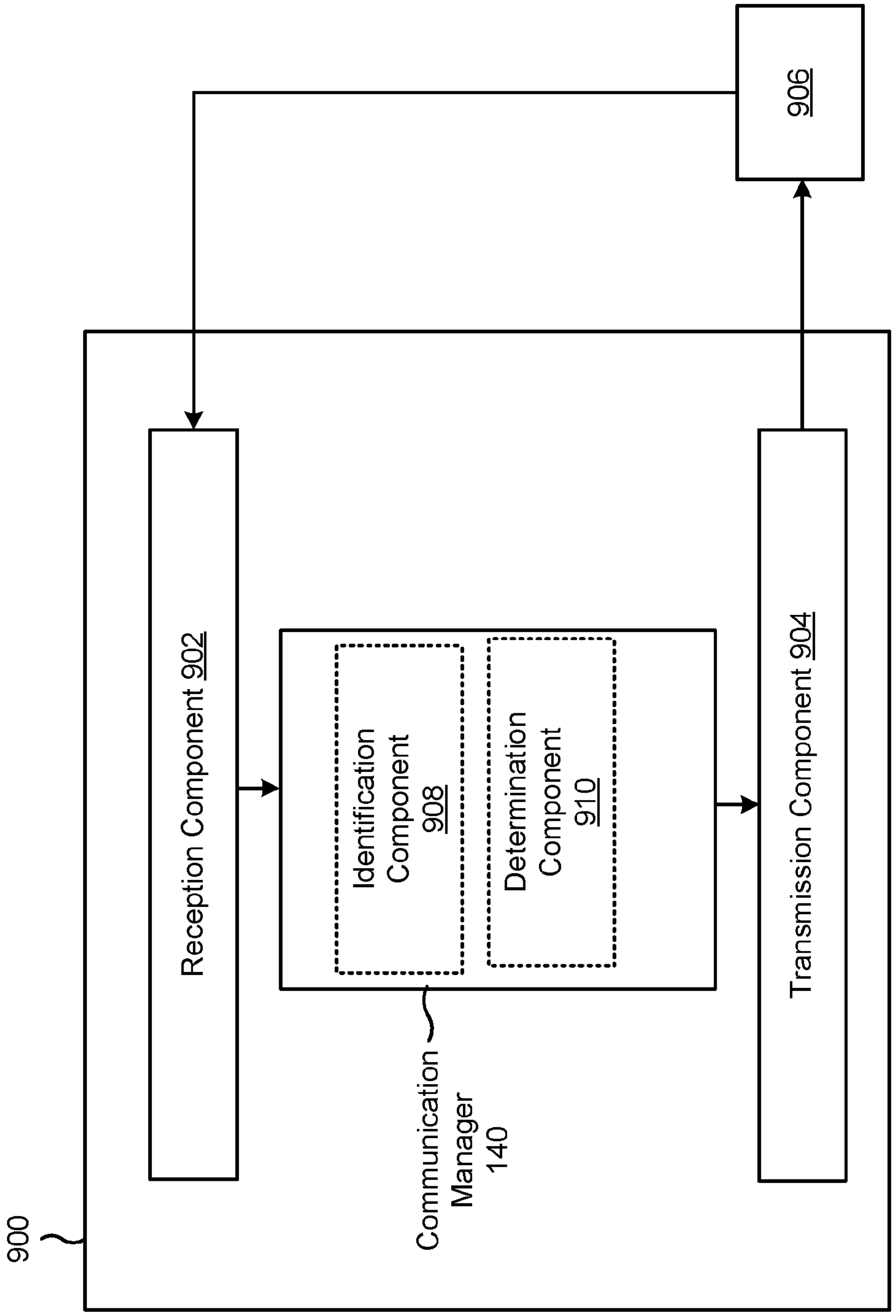
FIGS. 9-10 are diagrams of example apparatuses for wireless communication, in accordance with the present disclosure.

In a third aspect, alone or in combination with one or more of the first and second aspects, process 700 includes identifying (e.g., using communication manager 140 and/or identification component 908, depicted in FIG. 9) the repetition factor for the one or more repetitions using at least one of a first table that indicates associations between a plurality of MCS indications, a plurality of MCSs, and a plurality of repetition factors, or a second table that indicates associations between a plurality of TPC indications, a plurality of TPC values, and the plurality of repetition factors.

In a fourth aspect, alone or in combination with one or more of the first through third aspects, a first repetition factor and a second repetition factor, of the plurality of repetition factors, are respectively associated with a same quantity of MCS indications, of the plurality of MCS indications, or a same quantity of TPC indications, of the plurality of TPC indications.

In a fifth aspect, alone or in combination with one or more of the first through fourth aspects, a first repetition factor and a second repetition factor, of the plurality of repetition factors, are respectively associated with different quantities of MCS indications, of the plurality of MCS indications, or different quantities of TPC indications, of the plurality of TPC indications.

In a sixth aspect, alone or in combination with one or more of the first through fifth aspects, process 700 includes receiving (e.g., using communication manager 140 and/or reception component 902, depicted in FIG. 9), from the base station, information that identifies at least one of the first table or the second table.

In a seventh aspect, alone or in combination with one or more of the first through sixth aspects, the MCS indication indicates the repetition factor for the one or more repetitions.

In an eighth aspect, alone or in combination with one or more of the first through seventh aspects, process 700 includes identifying (e.g., using communication manager 140 and/or identification component 908, depicted in FIG. 9) the repetition factor for the one or more repetitions using a table that indicates associations between a plurality of MCS indications, a plurality of MCSs, and a plurality of repetition factors.

In a ninth aspect, alone or in combination with one or more of the first through eighth aspects, the plurality of repetition factors includes a subset of a set of possible repetition factors.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
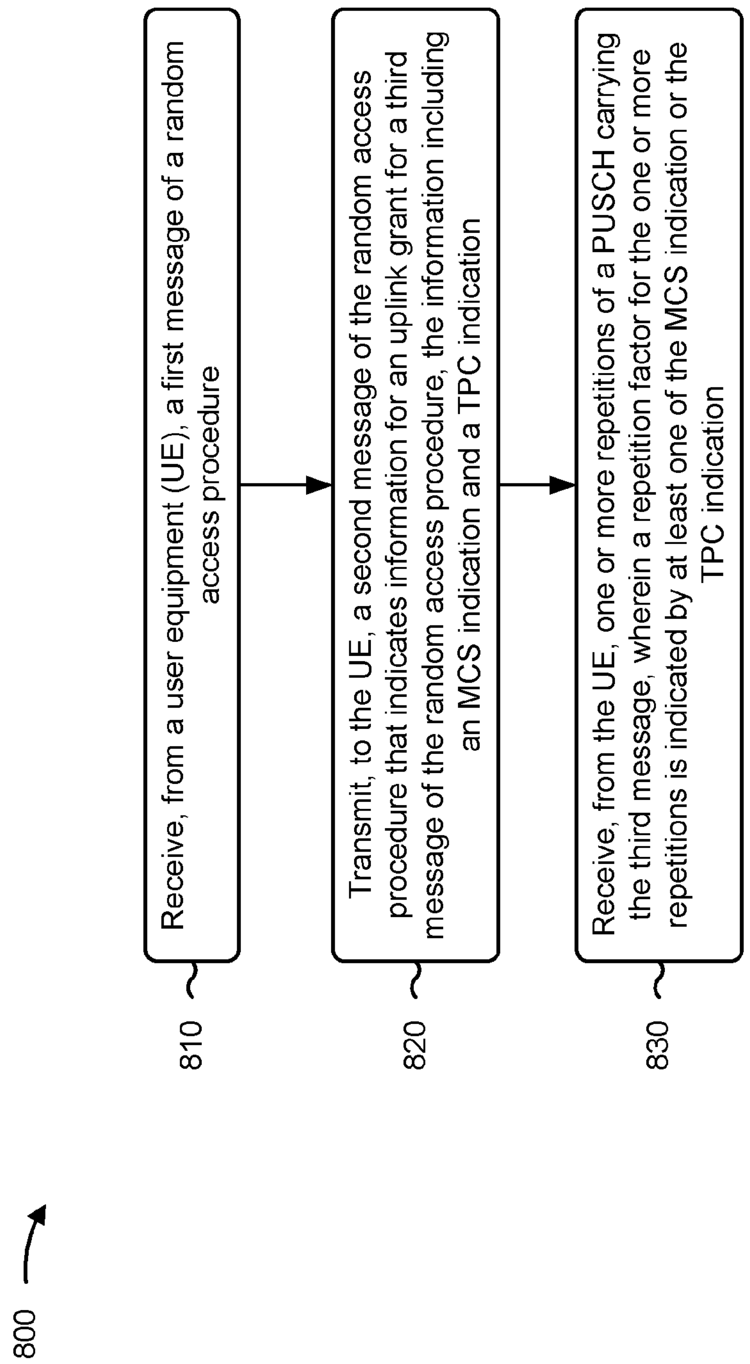

FIG. 8 is a diagram illustrating an example process 800 performed, for example, by a base station, in accordance with the present disclosure. Example process 800 is an example where the base station (e.g., base station 110) performs operations associated with indication of a repetition factor for a third message of a random access procedure.

As shown in FIG. 8, in some aspects, process 800 may include receiving, from a UE, a first message of a random access procedure (block 810). For example, the base station (e.g., using communication manager 150 and/or reception component 1002, depicted in FIG. 10) may receive, from a UE, a first message of a random access procedure, as described above.

As further shown in FIG. 8, in some aspects, process 800 may include transmitting, to the UE, a second message of the random access procedure that indicates information for an uplink grant for a third message of the random access procedure, the information including an MCS indication and a TPC indication (block 820). For example, the base station (e.g., using communication manager 150 and/or transmission component 1004, depicted in FIG. 10) may transmit, to the UE, a second message of the random access procedure that indicates information for an uplink grant for a third message of the random access procedure, the information including an MCS indication and a TPC indication, as described above.

As further shown in FIG. 8, in some aspects, process 800 may include receiving, from the UE, one or more repetitions of a PUSCH carrying the third message, wherein a repetition factor for the one or more repetitions is indicated by at least one of the MCS indication or the TPC indication (block 830). For example, the base station (e.g., using communication manager 150 and/or reception component 1002, depicted in FIG. 10) may receive, from the UE, one or more repetitions of a PUSCH carrying the third message, wherein a repetition factor for the one or more repetitions is indicated by at least one of the MCS indication or the TPC indication, as described above.

Process 800 may include additional aspects, such as any single aspect or any combination of aspects described below and/or in connection with one or more other processes described elsewhere herein.

In a first aspect, the MCS indication and the TPC indication jointly indicate the repetition factor for the one or more repetitions.

In a second aspect, alone or in combination with the first aspect, the repetition factor for the one or more repetitions is indicated by the MCS indication if the repetition factor for the one or more repetitions satisfies a threshold, and the repetition factor for the one or more repetitions is indicated by the TPC indication if the repetition factor for the one or more repetitions does not satisfy the threshold.

Figure 10:
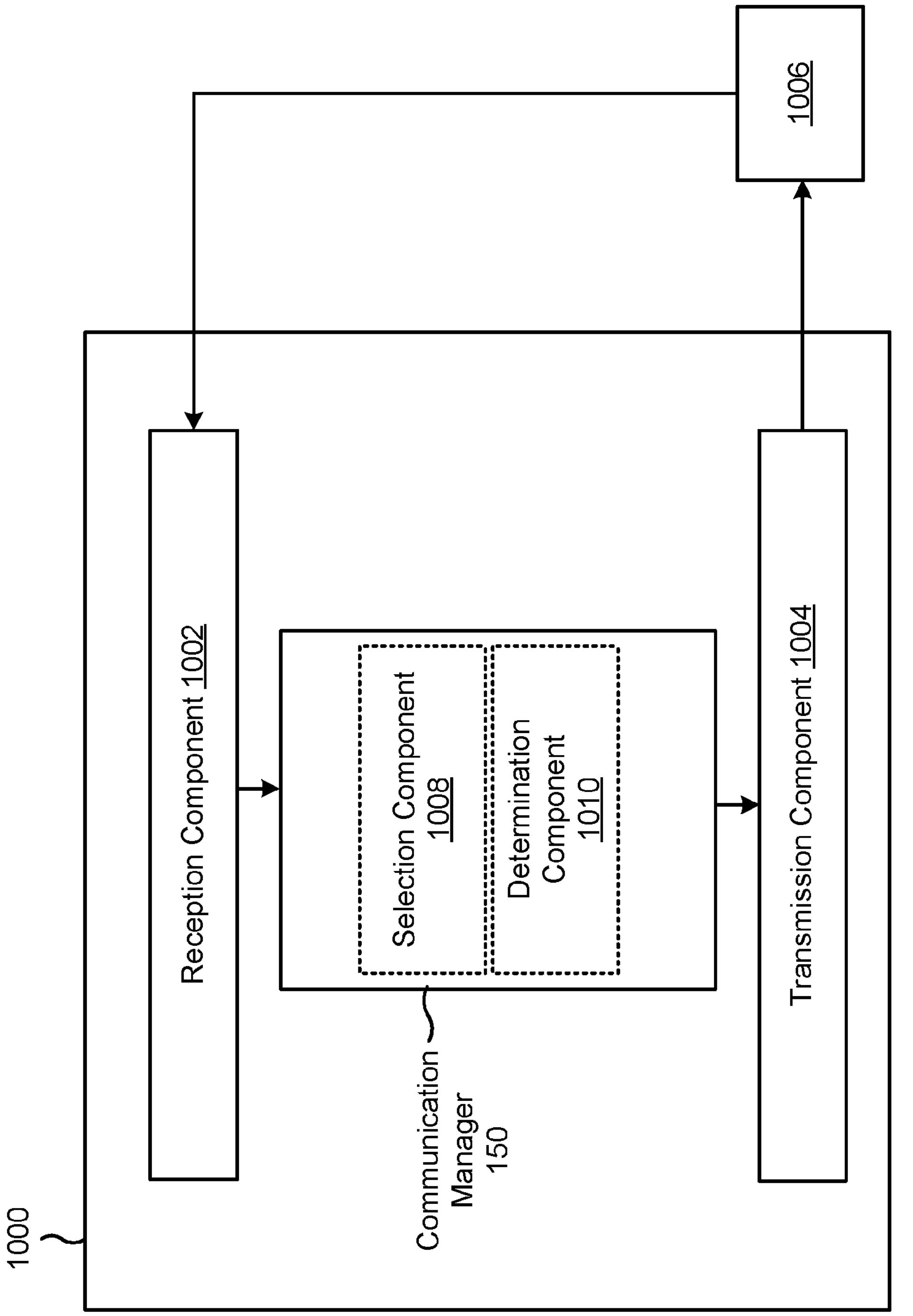

In a third aspect, alone or in combination with one or more of the first and second aspects, process 800 includes selecting (e.g., using communication manager 150 and/or selection component 1008, depicted in FIG. 10) the MCS indication and the TPC indication using at least one of a first table that indicates associations between a plurality of MCS indications, a plurality of MCSs, and a plurality of repetition factors, or a second table that indicates associations between a plurality of TPC indications, a plurality of TPC values, and the plurality of repetition factors.

In a fourth aspect, alone or in combination with one or more of the first through third aspects, a first repetition factor and a second repetition factor, of the plurality of repetition factors, are respectively associated with a same quantity of MCS indications, of the plurality of MCS indications, or a same quantity of TPC indications, of the plurality of TPC indications.

In a fifth aspect, alone or in combination with one or more of the first through fourth aspects, a first repetition factor and a second repetition factor, of the plurality of repetition factors, are respectively associated with different quantities of MCS indications, of the plurality of MCS indications, or different quantities of TPC indications, of the plurality of TPC indications.

In a sixth aspect, alone or in combination with one or more of the first through fifth aspects, process 800 includes transmitting (e.g., using communication manager 150 and/or transmission component 1004, depicted in FIG. 10), to the UE, information that identifies at least one of the first table or the second table.

In a seventh aspect, alone or in combination with one or more of the first through sixth aspects, the MCS indication indicates the repetition factor for the one or more repetitions.

In an eighth aspect, alone or in combination with one or more of the first through seventh aspects, process 800 includes selecting (e.g., using communication manager 150 and/or selection component 1008, depicted in FIG. 10) the MCS indication using a table that indicates associations between a plurality of MCS indications, a plurality of MCSs, and a plurality of repetition factors.

In a ninth aspect, alone or in combination with one or more of the first through eighth aspects, the plurality of repetition factors includes a subset of a set of possible repetition factors.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

FIG. 9 is a diagram of an example apparatus 900 for wireless communication. The apparatus 900 may be a UE, or a UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include the communication manager 140. The communication manager 140 may include one or more of an identification component 908 or a determination component 910, among other examples.

In some aspects, the apparatus 900 may be configured to perform one or more operations described herein in connection with FIGS. 5A-5D and 6. Additionally, or alternatively, the apparatus 900 may be configured to perform one or more processes described herein, such as process 700 of FIG. 7, or a combination thereof. In some aspects, the apparatus 900 and/or one or more components shown in FIG. 9 may include one or more components of the UE described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 906. In some aspects, the reception component 902 may include one or more antennas, a modem, a demodulator, a MIMO detector, a receive processor, a controller/processor, a memory, or a combination thereof, of the UE described in connection with FIG. 2.

The transmission component 904 may transmit communications, such as reference signals, control information, data communications, or a combination thereof, to the apparatus 906. In some aspects, one or more other components of the apparatus 906 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the UE described in connection with FIG. 2. In some aspects, the transmission component 904 may be co-located with the reception component 902 in a transceiver.

The transmission component 904 may transmit, to a base station, a first message of a random access procedure. The reception component 902 may receive, from the base station, a second message of the random access procedure that indicates information for an uplink grant for a third message of the random access procedure. In some aspects, the information may include an MCS indication and a TPC indication. The transmission component 904 may transmit, to the base station, one or more repetitions of a PUSCH carrying the third message. In some aspects, a repetition factor for the one or more repetitions is indicated by at least one of the MCS indication or the TPC indication.

The identification component 908 may identify the repetition factor for the one or more repetitions using at least one of a first table that indicates associations between a plurality of MCS indications, a plurality of MCSs, and a plurality of repetition factors, or a second table that indicates associations between a plurality of TPC indications, a plurality of TPC values, and the plurality of repetition factors. The identification component 908 may identify the repetition factor for the one or more repetitions using a table that indicates associations between a plurality of MCS indications, a plurality of MCSs, and a plurality of repetition factors.

The reception component 902 may receive, from the base station, information that identifies at least one of the first table or the second table. The transmission component 904 may transmit, to the base station, a request to transmit repetitions of the PUSCH carrying the third message. The determination component 910 may determine whether to transmit the request (e.g., based on one or more measurements obtained by the determination component 910).

The quantity and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

FIG. 10 is a diagram of an example apparatus 1000 for wireless communication. The apparatus 1000 may be a base station, or a base station may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include the communication manager 150. The communication manager 150 may include one or more of a selection component 1008 or a determination component 1010, among other examples.

In some aspects, the apparatus 1000 may be configured to perform one or more operations described herein in connection with FIGS. 5A-5D and 6. Additionally, or alternatively, the apparatus 1000 may be configured to perform one or more processes described herein, such as process 800 of FIG. 8, or a combination thereof. In some aspects, the apparatus 1000 and/or one or more components shown in FIG. 10 may include one or more components of the base station described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1006. In some aspects, the reception component 1002 may include one or more antennas, a modem, a demodulator, a MIMO detector, a receive processor, a controller/processor, a memory, or a combination thereof, of the base station described in connection with FIG. 2.

The transmission component 1004 may transmit communications, such as reference signals, control information, data communications, or a combination thereof, to the apparatus 1006. In some aspects, one or more other components of the apparatus 1006 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the base station described in connection with FIG. 2. In some aspects, the transmission component 1004 may be co-located with the reception component 1002 in a transceiver.

The reception component 1002 may receive, from a UE, a first message of a random access procedure. The transmission component 1004 may transmit, to the UE, a second message of the random access procedure that indicates information for an uplink grant for a third message of the random access procedure. In some aspects, the information includes an MCS indication and a TPC indication. The reception component 1002 may receive, from the UE, one or more repetitions of a PUSCH carrying the third message. In some aspects, a repetition factor for the one or more repetitions is indicated by at least one of the MCS indication or the TPC indication.

The selection component 1008 may select the MCS indication and the TPC indication using at least one of a first table that indicates associations between a plurality of MCS indications, a plurality of MCSs, and a plurality of repetition factors, or a second table that indicates associations between a plurality of TPC indications, a plurality of TPC values, and the plurality of repetition factors. The selection component 1008 may select the MCS indication using a table that indicates associations between a plurality of MCS indications, a plurality of MCSs, and a plurality of repetition factors.

The transmission component 1004 may transmit, to the UE, information that identifies at least one of the first table or the second table. The reception component 1002 may receive, from the UE, a request to transmit repetitions of the PUSCH carrying the third message. The determination component 1010 may determine the repetition factor for the one or more repetitions.

The quantity and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by an apparatus of a user equipment (UE), comprising: transmitting, to a base station, a first message of a random access procedure; receiving, from the base station, a second message of the random access procedure that indicates information for an uplink grant for a third message of the random access procedure, the information including a modulation and coding scheme (MCS) indication and a transmit power control (TPC) indication; and transmitting, to the base station, one or more repetitions of a physical uplink shared channel (PUSCH) carrying the third message, wherein a repetition factor for the one or more repetitions is indicated by at least one of the MCS indication or the TPC indication.

Aspect 2: The method of Aspect 1, wherein the MCS indication and the TPC indication jointly indicate the repetition factor for the one or more repetitions.

Aspect 3: The method of any of Aspects 1-2, wherein the repetition factor for the one or more repetitions is indicated by the MCS indication if the repetition factor for the one or more repetitions satisfies a threshold, and the repetition factor for the one or more repetitions is indicated by the TPC indication if the repetition factor for the one or more repetitions does not satisfy the threshold.

Aspect 4: The method of any of Aspects 1-3, further comprising: identifying the repetition factor for the one or more repetitions using at least one of a first table that indicates associations between a plurality of MCS indications, a plurality of MCSs, and a plurality of repetition factors, or a second table that indicates associations between a plurality of TPC indications, a plurality of TPC values, and the plurality of repetition factors.

Aspect 5: The method of Aspect 4, wherein a first repetition factor and a second repetition factor, of the plurality of repetition factors, are respectively associated with a same quantity of MCS indications, of the plurality of MCS indications, or a same quantity of TPC indications, of the plurality of TPC indications.

Aspect 6: The method of Aspect 4, wherein a first repetition factor and a second repetition factor, of the plurality of repetition factors, are respectively associated with different quantities of MCS indications, of the plurality of MCS indications, or different quantities of TPC indications, of the plurality of TPC indications.

Aspect 7: The method of any of Aspects 4-6, further comprising: receiving, from the base station, information that identifies at least one of the first table or the second table.

Aspect 8: The method of Aspect 1, wherein the MCS indication indicates the repetition factor for the one or more repetitions.

Aspect 9: The method of any of Aspects 1 or 8, further comprising: identifying the repetition factor for the one or more repetitions using a table that indicates associations between a plurality of MCS indications, a plurality of MCSs, and a plurality of repetition factors.

Aspect 10: The method of Aspect 9, wherein the plurality of repetition factors include a subset of a set of possible repetition factors.

Aspect 11: A method of wireless communication performed by an apparatus of a base station, comprising: receiving, from a user equipment (UE), a first message of a random access procedure; transmitting, to the UE, a second message of the random access procedure that indicates information for an uplink grant for a third message of the random access procedure, the information including a modulation and coding scheme (MCS) indication and a transmit power control (TPC) indication; and receiving, from the UE, one or more repetitions of a physical uplink shared channel (PUSCH) carrying the third message, wherein a repetition factor for the one or more repetitions is indicated by at least one of the MCS indication or the TPC indication.

Aspect 12: The method of Aspect 11, wherein the MCS indication and the TPC indication jointly indicate the repetition factor for the one or more repetitions.

Aspect 13: The method of any of Aspects 11-12, wherein the repetition factor for the one or more repetitions is indicated by the MCS indication if the repetition factor for the one or more repetitions satisfies a threshold, and the repetition factor for the one or more repetitions is indicated by the TPC indication if the repetition factor for the one or more repetitions does not satisfy the threshold.

Aspect 14: The method of any of Aspects 11-13, further comprising: selecting the MCS indication and the TPC indication using at least one of a first table that indicates associations between a plurality of MCS indications, a plurality of MCSs, and a plurality of repetition factors, or a second table that indicates associations between a plurality of TPC indications, a plurality of TPC values, and the plurality of repetition factors.

Aspect 15: The method of Aspect 14, wherein a first repetition factor and a second repetition factor, of the plurality of repetition factors, are respectively associated with a same quantity of MCS indications, of the plurality of MCS indications, or a same quantity of TPC indications, of the plurality of TPC indications.

Aspect 16: The method of Aspect 14, wherein a first repetition factor and a second repetition factor, of the plurality of repetition factors, are respectively associated with different quantities of MCS indications, of the plurality of MCS indications, or different quantities of TPC indications, of the plurality of TPC indications.

Aspect 17: The method of any of Aspects 14-16, further comprising: transmitting, to the UE, information that identifies at least one of the first table or the second table.

Aspect 18: The method of Aspect 11, wherein the MCS indication indicates the repetition factor for the one or more repetitions.

Aspect 19: The method of any of Aspects 11 or 18, further comprising: selecting the MCS indication using a table that indicates associations between a plurality of MCS indications, a plurality of MCSs, and a plurality of repetition factors.

Aspect 20: The method of Aspect 19, wherein the plurality of repetition factors include a subset of a set of possible repetition factors.

Aspect 21: An apparatus for wireless communication at a device, comprising a processor; memory coupled with the processor; and instructions stored in the memory and executable by the processor to cause the apparatus to perform the method of one or more of Aspects 1-10.

Aspect 22: A device for wireless communication, comprising a memory and one or more processors coupled to the memory, the one or more processors configured to perform the method of one or more of Aspects 1-10.

Aspect 23: An apparatus for wireless communication, comprising at least one means for performing the method of one or more of Aspects 1-10.

Aspect 24: A non-transitory computer-readable medium storing code for wireless communication, the code comprising instructions executable by a processor to perform the method of one or more of Aspects 1-10.

Aspect 25: A non-transitory computer-readable medium storing a set of instructions for wireless communication, the set of instructions comprising one or more instructions that, when executed by one or more processors of a device, cause the device to perform the method of one or more of Aspects 1-10.

Aspect 26: An apparatus for wireless communication at a device, comprising a processor; memory coupled with the processor; and instructions stored in the memory and executable by the processor to cause the apparatus to perform the method of one or more of Aspects 11-20.

Aspect 27: A device for wireless communication, comprising a memory and one or more processors coupled to the memory, the one or more processors configured to perform the method of one or more of Aspects 11-20.

Aspect 28: An apparatus for wireless communication, comprising at least one means for performing the method of one or more of Aspects 11-20.

Aspect 29: A non-transitory computer-readable medium storing code for wireless communication, the code comprising instructions executable by a processor to perform the method of one or more of Aspects 11-20.

Aspect 30: A non-transitory computer-readable medium storing a set of instructions for wireless communication, the set of instructions comprising one or more instructions that, when executed by one or more processors of a device, cause the device to perform the method of one or more of Aspects 11-20.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:

a memory; and one or more processors, coupled to the memory, configured to cause the apparatus to:

transmit, to a base station, a first message of a random access procedure;

receive, from the base station, a second message of the random access procedure that indicates information for an uplink grant for a third message of the random access procedure, the information including a modulation and coding scheme (MCS) indication and a transmit power control (TPC) indication; and transmit, to the base station, one or more repetitions of a physical uplink shared channel (PUSCH) carrying the third message, wherein a repetition factor for the one or more repetitions is indicated by at least one of the MCS indication or the TPC indication;

wherein the repetition factor for the one or more repetitions is indicated by the MCS indication if the repetition factor for the one or more repetitions satisfies a threshold, and the repetition factor for the one or more repetitions is indicated by the TPC indication if the repetition factor for the one or more repetitions does not satisfy the threshold.

2. The apparatus of claim 1, wherein the MCS indication and the TPC indication jointly indicate the repetition factor for the one or more repetitions.

3. The apparatus of claim 1, wherein the one or more processors are further configured to cause the apparatus to:

identify the repetition factor for the one or more repetitions using at least one of a first table that indicates associations between a plurality of MCS indications, a plurality of MCSs, and a plurality of repetition factors, or a second table that indicates associations between a plurality of TPC indications, a plurality of TPC values, and the plurality of repetition factors.

4. The apparatus of claim 3, wherein a first repetition factor and a second repetition factor, of the plurality of repetition factors, are respectively associated with a same quantity of MCS indications, of the plurality of MCS indications, or a same quantity of TPC indications, of the plurality of TPC indications.

5. The apparatus of claim 3, wherein a first repetition factor and a second repetition factor, of the plurality of repetition factors, are respectively associated with different quantities of MCS indications, of the plurality of MCS indications, or different quantities of TPC indications, of the plurality of TPC indications.

6. The apparatus of claim 3, wherein the one or more processors are further configured to cause the apparatus to:

receive, from the base station, information that identifies at least one of the first table or the second table.

7. The apparatus of claim 1, wherein the MCS indication indicates the repetition factor for the one or more repetitions.

8. The apparatus of claim 1, wherein the one or more processors are further configured to cause the apparatus to:

identify the repetition factor for the one or more repetitions using a table that indicates associations between a plurality of MCS indications, a plurality of MCSs, and a plurality of repetition factors.

9. The apparatus of claim 8, wherein the plurality of repetition factors includes a subset of a set of possible repetition factors.

10. An apparatus for wireless communication at a base station, comprising:

a memory; and one or more processors, coupled to the memory, configured to cause the apparatus to:

receive, from a user equipment (UE), a first message of a random access procedure;

transmit, to the UE, a second message of the random access procedure that indicates information for an uplink grant for a third message of the random access procedure, the information including a modulation and coding scheme (MCS) indication and a transmit power control (TPC) indication; and receive, from the UE, one or more repetitions of a physical uplink shared channel (PUSCH) carrying the third message, wherein a repetition factor for the one or more repetitions is indicated by at least one of the MCS indication or the TPC indication;

wherein the repetition factor for the one or more repetitions is indicated by the MCS indication if the repetition factor for the one or more repetitions satisfies a threshold, and the repetition factor for the one or more repetitions is indicated by the TPC indication if the repetition factor for the one or more repetitions does not satisfy the threshold.

11. The apparatus of claim 10, wherein the MCS indication and the TPC indication jointly indicate the repetition factor for the one or more repetitions.

12. The apparatus of claim 10, wherein the one or more processors are further configured to cause the apparatus to:

select the MCS indication and the TPC indication using at least one of a first table that indicates associations between a plurality of MCS indications, a plurality of MCSs, and a plurality of repetition factors, or a second table that indicates associations between a plurality of TPC indications, a plurality of TPC values, and the plurality of repetition factors.

13. The apparatus of claim 12, wherein a first repetition factor and a second repetition factor, of the plurality of repetition factors, are respectively associated with a same quantity of MCS indications, of the plurality of MCS indications, or a same quantity of TPC indications, of the plurality of TPC indications.

14. The apparatus of claim 12, wherein a first repetition factor and a second repetition factor, of the plurality of repetition factors, are respectively associated with different quantities of MCS indications, of the plurality of MCS indications, or different quantities of TPC indications, of the plurality of TPC indications.

15. The apparatus of claim 12, wherein the one or more processors are further configured to cause the apparatus to:

transmit, to the UE, information that identifies at least one of the first table or the second table.

16. The apparatus of claim 10, wherein the MCS indication indicates the repetition factor for the one or more repetitions.

17. The apparatus of claim 10, wherein the one or more processors are further configured to cause the apparatus to:

select the MCS indication using a table that indicates associations between a plurality of MCS indications, a plurality of MCSs, and a plurality of repetition factors.

18. The apparatus of claim 17, wherein the plurality of repetition factors includes a subset of a set of possible repetition factors.

19. A method of wireless communication performed by an apparatus of a user equipment (UE), comprising:

transmitting, to a base station, a first message of a random access procedure;

receiving, from the base station, a second message of the random access procedure that indicates information for an uplink grant for a third message of the random access procedure, the information including a modulation and coding scheme (MCS) indication and a transmit power control (TPC) indication; and transmitting, to the base station, one or more repetitions of a physical uplink shared channel (PUSCH) carrying the third message, wherein a repetition factor for the one or more repetitions is indicated by at least one of the MCS indication or the TPC indication;

wherein the repetition factor for the one or more repetitions is indicated by the MCS indication if the repetition factor for the one or more repetitions satisfies a threshold, and the repetition factor for the one or more repetitions is indicated by the TPC indication if the repetition factor for the one or more repetitions does not satisfy the threshold.

20. The method of claim 19, further comprising:

identifying the repetition factor for the one or more repetitions using at least one of a first table that indicates associations between a plurality of MCS indications, a plurality of MCSs, and a plurality of repetition factors, or a second table that indicates associations between a plurality of TPC indications, a plurality of TPC values, and the plurality of repetition factors.

21. The method of claim 19, wherein the MCS indication indicates the repetition factor for the one or more repetitions.

22. The method of claim 19, further comprising:

identifying the repetition factor for the one or more repetitions using a table that indicates associations between a plurality of MCS indications, a plurality of MCSs, and a plurality of repetition factors.

23. The method of claim 20, wherein a first repetition factor and a second repetition factor, of the plurality of repetition factors, are respectively associated with a same quantity of MCS indications, of the plurality of MCS indications, or a same quantity of TPC indications, of the plurality of TPC indications.

24. The method of claim 20, wherein a first repetition factor and a second repetition factor, of the plurality of repetition factors, are respectively associated with different quantities of MCS indications, of the plurality of MCS indications, or different quantities of TPC indications, of the plurality of TPC indications.

25. A method of wireless communication performed by an apparatus of a base station, comprising:

receiving, from a user equipment (UE), a first message of a random access procedure;

transmitting, to the UE, a second message of the random access procedure that indicates information for an uplink grant for a third message of the random access procedure, the information including a modulation and coding scheme (MCS) indication and a transmit power control (TPC) indication; and receiving, from the UE, one or more repetitions of a physical uplink shared channel (PUSCH) carrying the third message, wherein a repetition factor for the one or more repetitions is indicated by at least one of the MCS indication or the TPC indication;

wherein the repetition factor for the one or more repetitions is indicated by the MCS indication if the repetition factor for the one or more repetitions satisfies a threshold, and the repetition factor for the one or more repetitions is indicated by the TPC indication if the repetition factor for the one or more repetitions does not satisfy the threshold.

26. The method of claim 25, further comprising:

selecting the MCS indication and the TPC indication using at least one of a first table that indicates associations between a plurality of MCS indications, a plurality of MCSs, and a plurality of repetition factors, or a second table that indicates associations between a plurality of TPC indications, a plurality of TPC values, and the plurality of repetition factors.

27. The method of claim 25, wherein the MCS indication indicates the repetition factor for the one or more repetitions.

28. The method of claim 25, further comprising:

selecting the MCS indication using a table that indicates associations between a plurality of MCS indications, a plurality of MCSs, and a plurality of repetition factors.

29. The method of claim 26, wherein a first repetition factor and a second repetition factor, of the plurality of repetition factors, are respectively associated with a same quantity of MCS indications, of the plurality of MCS indications, or a same quantity of TPC indications, of the plurality of TPC indications.

30. The method of claim 26, wherein a first repetition factor and a second repetition factor, of the plurality of repetition factors, are respectively associated with different quantities of MCS indications, of the plurality of MCS indications, or different quantities of TPC indications, of the plurality of TPC indications.

* * * * *